United States Patent
Aida

(10) Patent No.: US 6,880,689 B2
(45) Date of Patent: Apr. 19, 2005

(54) PULLEY APPARATUS WITH BUILT-IN ROLLER CLUTCH AND ASSEMBLY METHOD THEREOF

(75) Inventor: Hiroshi Aida, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/312,689

(22) PCT Filed: Feb. 28, 2002

(86) PCT No.: PCT/JP02/01880

§ 371 (c)(1),
(2), (4) Date: Aug. 4, 2003

(87) PCT Pub. No.: WO03/025433

PCT Pub. Date: Mar. 27, 2003

(65) Prior Publication Data

US 2004/0011618 A1 Jan. 22, 2004

(30) Foreign Application Priority Data

Sep. 11, 2001 (JP) .......................... 2001-274591

(51) Int. Cl.⁷ .............................................. F16H 55/36
(52) U.S. Cl. .................................... 192/45; 192/110 R
(58) Field of Search ............................... 192/41 R, 45, 192/109 R, 110 R

(56) References Cited

U.S. PATENT DOCUMENTS

| | | | | |
|---|---|---|---|---|
| 3,017,002 A | * | 1/1962 | Marland | 192/45 |
| 4,821,856 A | * | 4/1989 | Lederman | 192/45 |
| 5,722,521 A | | 3/1998 | Awaji et al. | |
| 6,343,682 B1 | * | 2/2002 | Terada et al. | 192/45 |
| 6,513,633 B2 | * | 2/2003 | Aida et al. | 192/45 |

FOREIGN PATENT DOCUMENTS

| | | |
|---|---|---|
| DE | 19531745 A | 3/1996 |
| DE | 20009895 U | 11/2000 |
| EP | 1101978 A | 5/2001 |
| JP | 07139550 A | 5/1995 |
| JP | 10213207 | 8/1998 |
| JP | 10285873 A | 10/1998 |
| JP | 11022753 A | 1/1999 |
| JP | 11063026 | 3/1999 |

* cited by examiner

Primary Examiner—Saul Rodriguez
(74) Attorney, Agent, or Firm—Crowell & Moring LLP

(57) ABSTRACT

Excellent durability and reliability are provided and assembling work is made easy.

The clutch retainer 28a of the roller clutch 10a is prevented from being displaced in the axial direction. It is prevented that part of the clutch retainer 28a rubs the portion rotating together with the follower pulley 7a, so that the heat generation during over-run is prevented. Accordingly, grease degradation is prevented, and durability and reliability are improved. In addition, the inner clutch ring 21 of the roller clutch 10a and the rollers are provided with a chamfered portion along the outer periphery at the end thereof in the axial direction. Accordingly, the rollers 26 are positioned properly in the circumferential direction, while the inner clutch ring 21 is easily installed on the inner diameter side of the rollers 26, and the assembling work is made easy.

7 Claims, 18 Drawing Sheets

(A)

(B)

PULLEY APPARATUS WITH BUILT-IN ROLLER CLUTCH AND ASSEMBLY METHOD THEREOF

FIELD OF THE INVENTION

This invention relates to an improvement in a pulley apparatus with built-in roller clutch for the auxiliary equipment drive of an engine, and its assembly method, for example used as a follower pulley that is fastened to an end of the rotating shaft of the alternator in an automobile generator, or as a drive pulley that is fastened to an end of the crank shaft of an automobile engine.

BACKGROUND OF THE INVENTION

The construction of an alternator for generating the required electrical power for an automobile and which functions as the drive source for the automobile engine is disclosed, for example in Japanese patent publication No. Toku Kai Hei 7-139550. FIG. 1 shows the alternator 1 that is described in this publication. A pair of rolling bearings 4 supports the rotating shaft 3 inside the housing 2 such that it rotates freely. There is a rotor 5 and a commutator 6 in the middle section of this rotating shaft 3. Also, a follower pulley 7 is fastened to the portion on one end (right end in FIG. 1) of the rotating shaft 3 that protrudes outside the housing 2. When installed in the engine, there is an endless belt that extends around this follower pulley 7 such that the engine can freely drive the rotating shaft 3 by way of the crankshaft.

Typically, a follower pulley that was simply fastened to the rotating shaft 3 was used as the follower pulley 7. However, in recent years, various kinds of pulley apparatuses with built-in one-way clutches have been proposed and used in some applications, by which power is freely transmitted to the rotating shaft from the endless belt when there is a tendency for the running speed of the endless belt to be constant or accelerating, and where the follower pulley and rotating shaft rotate freely relative to each other when there is a tendency for the running speed of the endless belt to be decelerating. For example, a pulley apparatus with built-in one-way clutch having this kind of function has been disclosed in Japanese patent publication Nos. Toku Kai Hei 10-213207, Toku Kai Hei 10-285873, Toku Kai Hei 11-22753 and Toku Kai Hei 11-63026. Also, the use of a roller clutch as the one-way clutch has been known previously and has been disclosed in the aforementioned publications.

FIG. 2 to FIG. 6 show a conventional pulley apparatus with the built-in roller clutch as described in these publications. This pulley apparatus with built-in roller clutch has a sleeve 8, which is a shaft member (rotating shaft member) that can be fitted and fastened onto the rotating shaft 3 of the alternator 1 (see FIG. 1). Also, the follower pulley 7a which is a pulley member is located around this sleeve 8 such that it is concentric with the sleeve 8. Moreover, a pair of ball bearings 9 and a roller clutch 10 are located between the outer peripheral surface of the sleeve 8 and the inner peripheral surface of the follower pulley 7a.

The sleeve 8 is shaped generally in a semi-cylindrical shape, and fitted onto and fastened around the end of the rotating shaft 3 of the alternator 1 such that it rotates together with the rotating shaft 3. Accordingly, in the example shown in the figures, a screw hole section 11 is formed in the middle section on the inner peripheral surface of the sleeve 8, such that this screw hole section 11 can screw together with the male screw section formed on the outer peripheral surface on the tip end of the rotating shaft 3. Moreover, a fastening hole section 12 having a hexagonal-shaped cross section is formed on the tip end (left end in FIG. 2) on the inner peripheral surface of the sleeve 8, so that the tip end of a tool such as a hexagonal-shaped wrench can be fastened to the fastening hole section 12. Furthermore, the base end (right end in FIG. 2) on the inner peripheral surface of the sleeve 8 is a circular hole section 13 into which the middle of the tip end of the rotating shaft 3 can be fitted with no play therebetween. A spline joint, non-circular joint, key joint or other construction can be used as the construction for ensuring that there is no relative rotation between the sleeve 8 and the rotating shaft 3 in combination. Also, the center section of the outer peripheral surface of the sleeve 8 is a large-diameter section 14 that has a larger diameter than the other sections.

On the other hand, the tip end half of the outer peripheral surface of the follower pulley 7a has a wave-shaped cross section in the width direction, around which part of an endless belt called a poly V-belt extends. Also, the roller clutch 10 is located in the middle section in the axial direction of the space that exists between the outer peripheral surface of the sleeve 8 and the inner peripheral surface of the follower pulley 7a, and there are ball bearings 9 that are located near the opposite ends in the axial direction of this space such that they are located on both sides in the axial direction of the roller clutch 10.

Of these parts, the ball bearings 9 support both radial loads and axial loads that are applied to the follower pulley 7a, and allow the follower pulley 7a to rotate freely with respect to the sleeve 8. Each of the ball bearings 9 comprises: an outer race 16 that has a deep-groove type outer-ring raceway 15 formed around its inner peripheral surface; an inner race 18 that has a deep-groove type inner-ring raceway 17 formed around its outer peripheral surface; and a plurality of balls 19 that are located between the aforementioned outer-ring raceway 15 and inner-ring raceway 17 such that they roll freely. Also, the outer races 16 are fitted around the inner peripheral surface near the opposite ends of the follower pulley 7a, and the inner races 18 are fitted around the outer peripheral surface near the opposite ends of the sleeve 8. Moreover, in this state, one of the surfaces in the axial direction of each of the inner races 18 comes in contact with one of the opposite end surfaces (stepped surfaces) in the axial direction of the large-diameter section 14, respectively. In addition, the openings on the opposite ends of the space where the balls 19 are located are covered by seal rings 20 placed between the inner peripheral surfaces on the opposite ends of the outer races 16 and the outer peripheral surfaces on the opposite ends of the inner races 18.

Moreover, the roller clutch 10 transmits rotation force between the follower pulley 7a and the sleeve 8 only when there is a tendency for the follower pulley 7a to rotate in a specified direction with respect to the sleeve 8. In order to construct this kind of roller clutch 10, the inner clutch ring 21 is fitted onto and securely fastened around the large-diameter section 14 of the sleeve 8 through interference fit. This inner clutch ring 21 is made of carburized steel plate or the like and formed into a cylindrical shape by plastic processing such as pressing, and a cam surface 22 is formed around its outer peripheral surface. In other words, as shown in FIG. 3 and FIG. 5, by forming a plurality of concave sections 23, called the ramp section, at uniform intervals in the circumferential direction around the outer peripheral surface of the inner clutch ring 21, the outer peripheral surface is able to function as the cam surface 22. In the example shown in the figures, a tapered, concave chamfered section 24 is formed on one end (right end in FIG. 2) on the inner peripheral surface of the inner clutch ring 21, and this chamfered section 24 functions as a guide surface when fitting the inner clutch ring 21 on the outer peripheral surface of the large-diameter section 14.

On the other hand, an outer clutch ring 25 is fitted into and securely fastened around the middle section of the inner peripheral surface of the follower pulley 7a, and at least the middle section in the axial direction of the inner peripheral surface of the outer clutch ring 25 that comes in contact with rollers 26 (described later) is a simple cylindrical surface. This outer clutch ring 25 is also made of carburized steel plate or the like and is formed entirely into a cylindrical shape by plastic process such as pressing. Provided on the opposite ends in the axial direction of the outer clutch ring 25 are ring sections which form inward facing rim sections 27a, 27b in a flange shape. Of these rim sections 27a, 27b, the rim section 27a (left rim section in FIG. 2) is formed in advance when manufacturing the outer clutch ring 25, so it has the same thickness as the cylindrical section of the outer clutch ring 25. On the other hand, the rim section 27b (right rim section in FIG. 2) is formed after the rollers 26 (described later) and clutch retainer 28 have been assembled on the inside in the radial direction of the outer clutch ring 25, so it is thin.

Also, the plurality of rollers 26, which together with the inner clutch ring 21 and outer clutch ring 25 make up the roller clutch 10, are held in place by the clutch retainer 28 which is fitted onto the inner clutch ring 21 such that it does not rotated with respect to the inner clutch ring 21, and such that the rollers 26 can roll and move a little in the circumferential direction. This clutch retainer 28 is made from a synthetic resin (for example, a synthetic resin such as polyamide 66, polyamide 46, polyphenylene sulfide in which glass fibers are mixed in an amount of about 20%), and as partly shown in FIG. 4, comprises a pair of ring-shaped rim sections 29, and a plurality of column sections 30 that connect both of these rim sections 29 to each other.

Moreover, the sections that are surrounded by the inner peripheral surfaces of the rim sections 29 and the side surfaces in the circumferential direction of the column sections 30 are pockets 31 for supporting the rollers 26 such that they can roll freely and displace a little in the circumferential direction. Also, as shown in FIG. 5, the fitting protrusions 32 are formed at a plurality of locations on the inner peripheral surface of the rim sections 29, and engaged with the concave sections 23 which are formed on the outer peripheral surface of the inner clutch ring 21, the clutch retainer 28 is mounted on the inner clutch ring 21 such that it is not capable of rotating relative to the inner clutch ring 21.

Also, as shown in FIG. 6, springs 33 are mounted on one of the side surfaces in the circumferential direction of the column sections 30 of the clutch retainer 28. The rollers are held in the pockets 31, and the springs 33 are mounted on each column section 30 and elastically press the rollers 26 in the same circumferential direction of the clutch retainer 28 (to the right or clockwise direction in FIG. 5) in the substantially cylindrical-shaped gap that is formed between the outer peripheral surface of the cam surface 22 and the inner peripheral surface (cylindrical surface) in the middle section of the outer clutch ring 25, toward the section of the gap where the width in the radial direction is narrower. In the example shown in the figures, plate springs that are formed by bending spring steel plate into a substantially triangular hook shape are used as the springs 33, however it is also possible to use plastic or synthetic resin springs that are integrated with the clutch retainer 28.

Also, the opposite end surface in the axial direction of this clutch retainer 28 come close to and face the inside surface of both rim sections 27a, 27b of the outer clutch ring 25, in order to prevent the clutch retainer 28 from moving in the axial direction. In addition to this construction for preventing the clutch retainer from moving in the axial direction, construction where a plurality of stepped sections that are formed on the outer peripheral surface of the shaft member such as the sleeve are engaged with part of the clutch retainer is known and has been disclosed, for example, in Japanese patent publication No. Toku Kai Hei 11-22753 and Japanese patent publication No. Toku Kai 2001-165201.

When there is a tendency for the follower pulley 7a and sleeve 8 to rotate relative to each other in a specified direction when using the pulley apparatus with built-in roller clutch that is constructed as described above, or in other words, when there is a tendency for the follower pulley 7a to rotate with respect to the sleeve 8 in a direction such that the springs 33 press the rollers 26 (to the right or clockwise in FIG. 5), respectively, the rollers 26 bite into the sections of the cylindrical gap where the width in the radial direction is narrower. The follower pulley 7a is not able to rotate relative to the sleeve 8 (locked state). On the other hand, when the follower pulley 7a rotates relative to the sleeve 8 in the direction opposite the specified direction, or in other words, when there is a tendency for the follower pulley 7a to rotate relative to the sleeve 8 in the direction opposite the direction that the springs 33 press the rollers 26 (to the left or counterclockwise in FIG. 5), the rollers 26 move back against the force of the springs 33 to the section of the cylindrical gap where the width in the radial direction is broader, and the pulley 7a is able to rotate freely with respect to the sleeve 8 (overrun state).

There are two reasons for using the pulley apparatus with built-in roller clutch for an alternator having the construction described above. The first reason is in order to extend the life of the endless belt. For example, in the case of using a diesel engine or a direct-injection type gasoline engine as the drive engine, changes in the rotational angular velocity of the crankshaft become large at low speed such as during idling. As a result, there are small changes in the running speed of the endless belt that extends around the drive pulley. On the other hand, the rotating shaft 3 of the alternator that is rotated and driven by this endless belt via the follower pulley does not change so rapidly due to the inertial mass of rotating shaft 3 and the rotor that is fastened to it. Also, when the follower pulley is simply fastened to the rotating shaft, there is a tendency for rubbing to occur between both the endless belt and the follower pulley due to the changes in rotational angular velocity of the crankshaft. As a result, stress in differing directions is repeatedly applied to the endless belt that rubs with this follower pulley, making it easy for slipping to occur between the endless belt and the follower pulley, or causes the life of the endless belt to become shortened.

Here, by using a pulley apparatus with built-in roller clutch for an alternator as the follower pulley mentioned above, rotational power is freely transmitted from the follower pulley to the rotating shaft 3 when there is a tendency for the running speed of the endless belt to be constant or accelerating, and in contrast, there is relative rotation between the follower pulley and rotating shaft 3 when there is a tendency for the running speed of the endless belt to be decelerating. In other words, when there is a tendency for the running speed of the endless belt to be decelerating, the rotational angular velocity of the follower pulley is slower than the rotational angular velocity of the rotating shaft, and thus it is possible to prevent strong rubbing at the area of contact between the endless belt and follower pulley. In this way, direction of the stress that acts at the area of rubbing between the follower pulley and endless belt is made constant, and thus it is possible to prevent slipping from occurring between the endless belt and the follower pulley, and prevent the life of the endless belt from decreasing.

The second reason is for improving the electrical generation efficiency of the alternator. The rotating shaft 3, to which the alternator rotor is fastened, is rotated and driven by the drive engine of the automobile via the endless belt and follower pulley. When a fixed type follower pulley is used and the rotational velocity of the drive engine suddenly drops, the rotational velocity of the rotor also drops suddenly, and thus the amount of electric current generated by the alternator also drops suddenly. On the other hand, by using a pulley apparatus with built-in roller clutch for an alternator as the follower pulley for the alternator, the rotational velocity of the rotor decreases gradually due to the inertial force even when the rotational velocity of the drive engine drops suddenly, and electrical generation also continues during that period. As a result, in comparison to using the fixed type follower pulley, it is possible to more effectively utilize the kinetic energy of the rotating shaft and rotor, and increase the amount of electrical current generated by the alternator.

The explanation above was made for the case of installing the pulley apparatus with built-in roller clutch on the side of the follower pulley; however, similar function and results are also obtained when the pulley apparatus with built-in roller clutch having the similar constructions as described above is installed on the end of the crankshaft on the drive side.

In the various documentation in which the conventional construction for a pulley apparatus with built-in roller clutch was been disclosed, construction for maintaining the durability and reliability of the pulley apparatus with built-in roller clutch, and the method for efficiently assembling the pulley apparatus with built-in roller clutch were not specifically disclosed.

Taking the above problems into consideration, it is an object of this invention to provide a pulley apparatus with built-in roller clutch that is capable of maintaining sufficient durability and reliability, and provide a method for assembling the pulley apparatus with built-in roller clutch easily.

DISCLOSURE OF THE INVENTION

The pulley apparatus with built-in roller clutch of this invention in a feature comprises: a pulley, a rotating shaft that is a shaft member, a roller clutch, a first ball bearing and a second ball bearing.

Of these, the pulley has a substantially cylindrical shape such that an endless belt can freely run around its outer peripheral surface.

Also, the rotating shaft is located on the inner-diameter side of the pulley such that it is concentric with the pulley.

Moreover, the roller clutch is installed between the inner peripheral section of the middle section in the axial direction of the pulley and the outer peripheral section of the middle section in the axial direction of the rotating shaft, and it transmits rotational force only in one direction between the pulley and the rotating shaft, or in other words, it is locked in one direction of rotation and unlocked in the other direction.

The roller clutch as mentioned above comprises: an outer-diameter section that corresponds to the like of outer clutch ring, an inner-diameter section that corresponds to the like of inner clutch ring, a retainer, a plurality of rollers, a plurality of springs, a fall-out-prevention means, and a second engagement section and first engagement section, which correspond to the fitting section and fitted section.

Of these, the like of outer clutch ring is formed around the inner peripheral surface of the middle section in the axial direction of the pulley.

Also, the like of inner clutch ring is formed around the outer peripheral surface of the middle section in the axial direction of the rotating shaft, and the outer peripheral surface is uneven in the circumferential direction to form a cam surface that corresponds to the cam section.

Also, the retainer is located between the outer peripheral surface of the like of inner clutch ring and the inner peripheral surface of the like of outer clutch ring, and has a plurality of pockets.

Moreover, the rollers are held inside the pockets of the retainer such that they can roll freely and move in circumferential direction of the retainer.

The springs are located between the rollers and the retainer, or in other words, they are engaged with the retainer to press the rollers in the same direction or circumferential direction of the retainer.

The fall-out-prevention means is located in part of the retainer, and prevents the rollers inside the pockets from falling out of the pockets into the inside in the radial direction of the retainer.

With respect to the fitting section and fitted section, the fitting section is formed on the inner peripheral surface of the retainer, and the fitting section is engaged with the fitted section that is formed on the like of inner clutch ring, such that it is possible to prevent the retainer from rotating with respect to the like of inner clutch ring.

Also, the first ball bearing is located between the inner peripheral section on one end in the axial direction of the pulley and the outer peripheral section on one end in the axial direction of the rotating shaft, and it supports radial loads and axial loads that are applied between the pulley and rotating shaft. The outer-diameter section of this first ball bearing is located on the inner peripheral section on one end in the axial direction of the pulley to have a first outer-ring raceway on the inner peripheral surface of the outer-diameter section. Also, the inner-diameter section of the first ball bearing is located on the outer peripheral section on one end in the axial direction of the rotating shaft to have a first inner-ring raceway on the outer peripheral surface of the inner-diameter section. Moreover, there is a plurality of first balls that roll freely between the first inner-ring raceway and the first outer-ring raceway.

The second ball bearing is located between the inner peripheral surface on the other end in the axial direction of the pulley and the outer peripheral surface on the other end in the axial direction of the rotating shaft, and it supports radial loads and axial loads that are applied between the pulley and rotating shaft. This second ball bearing has a second outer-ring raceway that is formed around the inner peripheral surface of the outer bearing race that is fitted into the inner peripheral surface of the other end in the axial direction of the pulley, a second inner-ring raceway that is formed around the outer peripheral surface of the inner bearing race that is fitted onto the outer peripheral surface of the other end in the axial direction of the rotating shaft, and a plurality of second balls that roll freely between the second inner-ring raceway and the second outer-ring raceway. Moreover, the rotating shaft and inner bearing race form a shaft unit or rotating-shaft unit.

Also, this rotating-shaft unit has a plurality of step sections that are formed around its outer peripheral surface. Two of these step sections are engaged with part of the retainer, so that it is possible to suppress movement in the axial direction of the retainer.

Furthermore, a chamfered section is formed on at least one of the end sections in the axial direction of the rollers for the roller clutch and the outer peripheral edge on one end surface in the axial direction of the like of inner clutch ring. The chamfered section becomes a guiding surface when bringing the like of inner clutch ring and the rollers together in the axial direction in order that the rollers can be placed around the like of inner clutch ring, while at the same time moving the rollers in the circumferential direction by the cam surface against the force of the springs. Incidentally, when the chamfered section is formed on the end in the axial direction, of the cam surface the "cam surface" includes this chamfered section.

The total amount of chamfering of the chamfered section (width in the radial direction) is larger than the dimension of overlap of the rollers and the like of inner clutch ring as seen from the axial direction. In other words, when the rollers and the like of inner clutch ring are seen from the axial direction with the retainer and the like of inner clutch ring placed such that they are concentric, and with a specified phase provided in the circumferential direction (part of the rolling contact surface of the rollers that are held in the retainer comes in contact with the inner peripheral surface of the like of outer clutch ring, and the rollers are pressed in the circumferential direction by the springs), the total amount of chamfering on the chamfered section, which is formed on at least one of the ends in the axial direction of the rollers and the outer peripheral edge on one end surface in the axial direction of the like of inner clutch ring, is greater than the dimension of overlapping between the rollers and the like of inner clutch ring.

Furthermore, in the assembly method for assembling the pulley apparatus with built-in roller clutch of this invention, in order to assemble the pulley apparatus with built-in roller clutch as described above, first, with the rollers held inside the pockets that are formed in the retainer of the roller clutch and pressed to one side in the circumferential direction of the pockets by the springs, the rollers and retainer are placed on the inner-diameter side of the like of outer clutch ring to form an assembly.

Then, the fitting section of the retainer is engaged with the fitted section of the like of inner clutch ring between the side of one end in the axial direction of the retainer and the side of one end in the axial direction of the like of inner clutch ring of the roller clutch, relative rotation between the like of inner clutch ring and the retainer is prevented.

Next, in order to assemble the like of inner clutch ring of the roller clutch on the inner-diameter side of the springs and the rollers that are held in the retainer, the end of the like of inner clutch ring is pressed toward the inner-diameter side of the rollers using as a guide the chamfered section that is formed on at least one of the ends in the axial direction of the rollers and the outer peripheral edge on one end surface in the axial direction of the like of inner clutch ring, or in other words, while using the chamfered section to press the like of inner clutch ring under the rollers held by the retainer, or toward the inner-diameter side of the rollers, the rollers are moved simultaneously by the cam surface, which is formed on the outer peripheral surface of the like of inner clutch ring, in the circumferential direction against the spring force, the rollers are moved to a specified position in the circumferential direction between the inner peripheral surface of the like of outer clutch ring and the outer peripheral surface of the like of inner clutch ring. Thus the roller clutch as mentioned above is formed.

After the roller clutch has been assembled between the inner peripheral surface of the middle section in the axial direction of the pulley and the outer peripheral surface of the middle section in the axial direction of the rotating shaft, the second ball bearing is assembled between the inner peripheral surface on the other end in the axial direction of the pulley and the outer peripheral surface on the other end in the axial direction of the rotating shaft.

The first ball bearing is assembled between the inner peripheral section on one end in the axial direction of the pulley and the outer peripheral section on one end in the axial direction of the rotating shaft before assembling the second ball bearing. It does not matter whether assembly of the first ball bearing is before or after assembly of the roller clutch.

The work of securing the second ball bearing, which is assembled between the inner peripheral surface on the other end in the axial direction of the pulley and the outer peripheral surface on the other end in the axial direction of the rotating shaft, can be performed by any one of the following methods: pressure fitting, crimping, welding or adhesive.

In the case of another assembly method for assembling the pulley apparatus with built-in roller clutch in another feature of this invention, a jig, whose outer shape is nearly the same as that of the like of inner clutch ring and which has a chamfered section on the side of the jig that is inserted inside the inner-diameter side of the rollers, is used to insert the like of inner clutch ring while compressing all of the springs simultaneously.

The pulley apparatus with built-in roller clutch of this invention and the method of assembling it make it possible to maintain suitable durability and reliability, as well as simplify assembly work.

The function and effect of being possible to maintain suitable durability and reliability is obtained by the engagement between a plurality of stepped sections that are formed around the outer peripheral surface of the rotating-shaft unit with part of the retainer in order to suppress movement in the axial direction of the retainer. In other words, the retainer is prevented from moving in the axial direction by the engagement between the stepped sections with part of the retainer, so the end surfaces in the axial direction of the retainer does not come in contact with the parts that rotate together with the pulley, such as part of the outer clutch ring. The retainer is installed such that it does not rotate with respect to the like of inner clutch ring that is fastened to the outer peripheral surface of the rotating-shaft. Accordingly, the pulley and retainer rotate relative to each other when the roller clutch is in overrun (when the connection is broken). Therefore, when the end surface in the axial direction of the retainer comes in contact with the parts that rotate together with the pulley such as part of the outer clutch ring, the temperature of the roller clutch rises due to the friction heat caused by rubbing at the area of contact during overrun. Also, as this temperature rise becomes excessive, the grease inside the roller clutch degrades and the anti-seizure capability is lost, so it becomes difficult to obtain adequate durability.

On the other hand, in the case of the pulley apparatus with built-in roller clutch of this invention, there is no relative rotation of the retainer to the rotating-shaft unit even during overrun, and movement in the axial direction of the retainer in the axial direction is suppressed between the retainer and the rotating-shaft unit, so strong rubbing between the retainer and opposing surfaces during overrun is prevented, and thus it is possible to suppress the friction heat that occurs during overrun, and to prevent degradation of the grease, so that durability is secured. Moreover, since it is possible to effectively prevent movement in the axial direction of the retainer and the like of inner clutch ring, it is possible to prevent the rolling contact surfaces of the rollers that are held by the retainer from separating in the axial direction away from the cam surface that is formed on the outer peripheral surface of the like of inner clutch ring. Therefore, it is possible to prevent an edge load from being applied to any part of the rolling contact surfaces as part of the rolling contact surfaces of the rollers come in contact with the end edge in the axial direction of the cam surface, and thus it is possible to prevent a decrease in fatigue life of these rolling contact surfaces and to improve the durability as well.

Also, simplification of the assembly work is made possible by forming the fall-out-prevention means and chamfering.

First, of these, the fall-out-prevention mean prevents the rollers that are held in the pockets of the retainer from falling inside in the radial direction of the retainer, so it becomes easy to perform the work of inserting the like of inner clutch ring, with the cam surface formed around its outer peripheral surface, into the inner-diameter side of the retainer and rollers that are assembled beforehand into the like of outer clutch ring. In other words, when there is no fall-out-prevention means, all or part of the rollers that are held in the pockets protrude or fall into the inner-diameter side of the retainer, and makes it difficult to push the like of inner clutch ring into the inner-diameter side of the retainer. On the other hand, in the case of this invention, there is a fall-out-prevention means that prevents the rollers from protruding or falling on the inner-diameter side of the retainer when pushing the like of inner clutch ring, making it possible to easily perform the work of pushing. In other words, the retainer for the roller clutch of this invention has two position control functions in one retainer; preventing the rollers from protruding too much or falling into the inner-diameter side of the retainer during assembly, and preventing the retainer itself from moving in the axial direction during use. From these two functions it is possible to simplify the assembly work and to maintain durability and reliability.

Also, the work of pushing the like of inner clutch ring in can be performed even easier by forming a chamfered section on at least one of the ends in the axial direction of the rollers and the outer peripheral edge of one end surface in the axial direction of the inner clutch ring. In other words, this chamfered section becomes a guiding surface when binging the like of inner clutch ring closer to the rollers in the axial direction in order to place the rollers around the like of inner clutch ring, so the work of pushing the end section of the like of inner clutch ring into the inner-diameter side of the rollers can be performed easily. That is, the fitting section that is formed on the retainer is engaged with the fitted section that is formed on the like of inner clutch ring in order to restrict the phase in the circumferential direction of the like of inner clutch ring and the retainer and prevent relative rotation between them, and then the like of inner clutch ring is pushed into the inner-diameter side of the rollers. Consequently, the chamfered section allows the like of inner clutch ring to be inserted into the inner-diameter side of the rollers.

Also, when pushing the like of inner clutch ring into the inner-diameter side of the rollers in this way, the cam surface that is formed on the outer peripheral surface of the like of inner clutch ring causes the rollers to simultaneously move in the circumferential direction against the force of the springs. Furthermore, these rollers are moved into a specified place between the inner peripheral surface of the like of outer clutch ring and the outer peripheral surface of the like of inner clutch ring (for example, at a portion closer to the outer diameter of the concave section of the cam surface where the portion simultaneously comes in contact with the inner peripheral surface of the like of outer clutch ring and the outer peripheral surface of the like of inner clutch ring), to form the roller clutch. Moving the rollers against the force of the springs to their specified location in this way is performed simultaneously for all of the rollers by the work of pushing the like of inner clutch ring into the inner-diameter side of the rollers, and thus making it possible to easily assemble the roller clutch. Moving the rollers simultaneously by the cam surface in the circumferential direction against the force of the springs in this way means moving the rollers to specified locations in the circumferential direction between the inner peripheral surface of the like of outer clutch ring and the outer peripheral surface of the like of inner clutch ring, as described above. It is by moving the rollers to specified locations between both of these surfaces in this way that it becomes possible to freely transmit rotation force between the like of outer clutch ring and the like of inner clutch ring. Incidentally, when there is a chamfered section formed on the ends in the axial direction of the cam surface, the "cam surface" includes that chamfered section.

In short, in the case of this invention, with the fall-out-prevention means, it is possible to prevent the diameter of the inscribed circle of the rollers from becoming too small when the rollers are assembled on the inner-diameter side of the like of outer clutch ring, as well as it is possible to prevent the rollers from protruding too far or falling into the inner-diameter side of the retainer, and a chamfered section is formed, so the inclined surfaces of the plurality of concave sections of the cam surface simultaneously move the rollers in the circumferential direction of the like of inner clutch ring when the like of inner clutch ring is pushed into the inner-diameter section of the rollers, resulting in that the rollers are moved to their specified locations. Therefore, there is no need to perform troublesome work such as independently compressing each individual spring when assembling the rollers and springs, and thus it is possible to more easily and efficiently assemble the pulley apparatus with built-in roller clutch.

To repeat, in the case of this invention, with the fall-out-prevention means that is formed on the retainer of the roller clutch, movement of the rollers toward the inner-diameter side of the retainer is suppressed, and it becomes easier to insert the like of inner clutch ring into the inner-diameter section of the retainer. Also, by using the chamfered section to insert the like of inner clutch ring into the inner-diameter side of the rollers, the springs are simultaneously compressed, and the rollers are simultaneously moved to their specified positions. Therefore, it becomes easy to perform the work of moving the rollers to their specified positions against the force of the springs, which up until now was troublesome because there was a plurality of rollers and springs. In other words, in regards to assembling the retainer, rollers, springs and the like of inner clutch ring, the like of inner clutch ring can easily be brought in contact with the rollers, and after they have been brought in contact, the work of simultaneously compressing the springs and moving the rollers to their specified positions can also be performed easily.

THE BEST EMBODIMENTS TO WORK THE INVENTION

Figure 1:
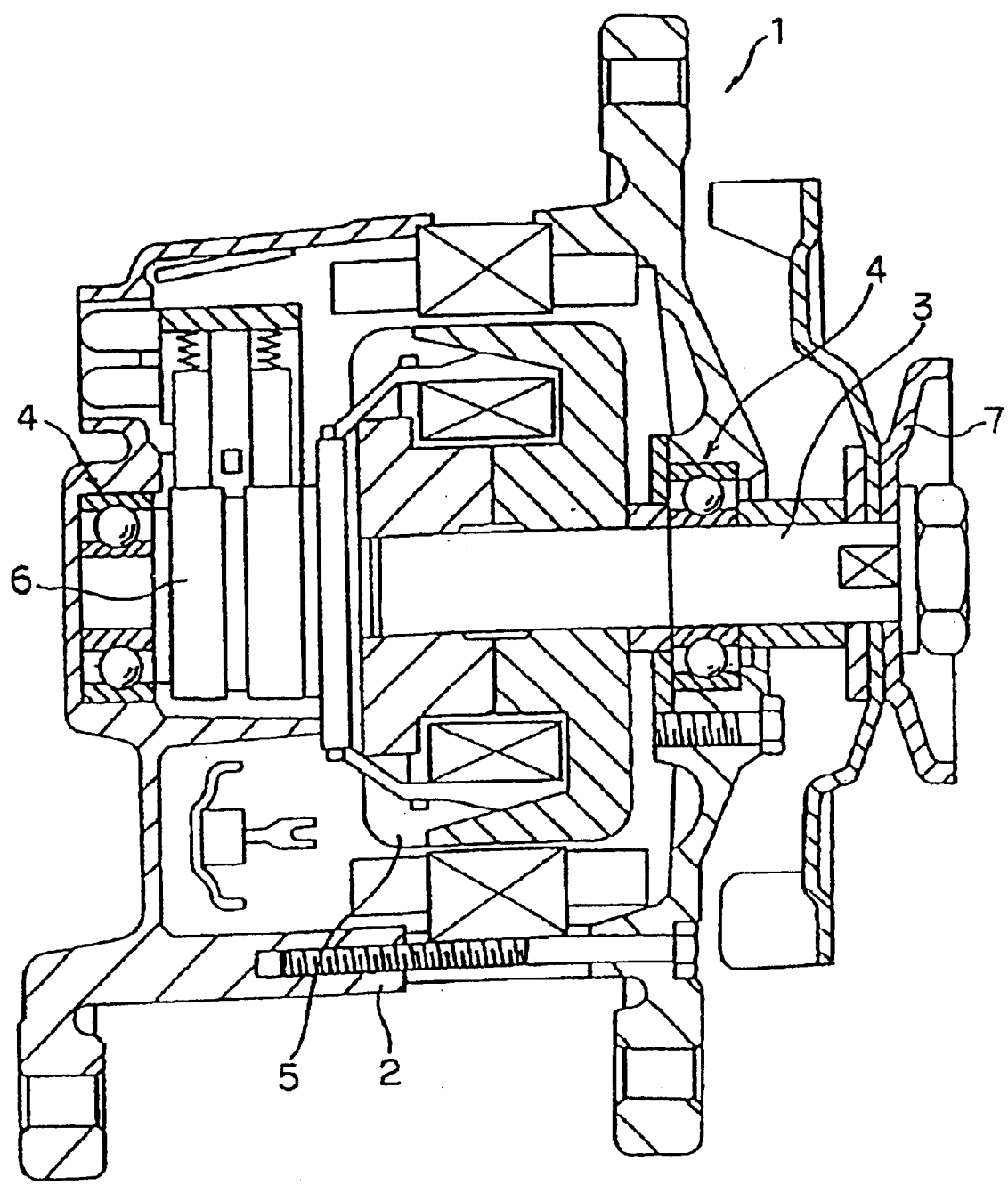
FIG. 1 is a cross sectional view to show an example of the conventional alternator.
Figure 2:
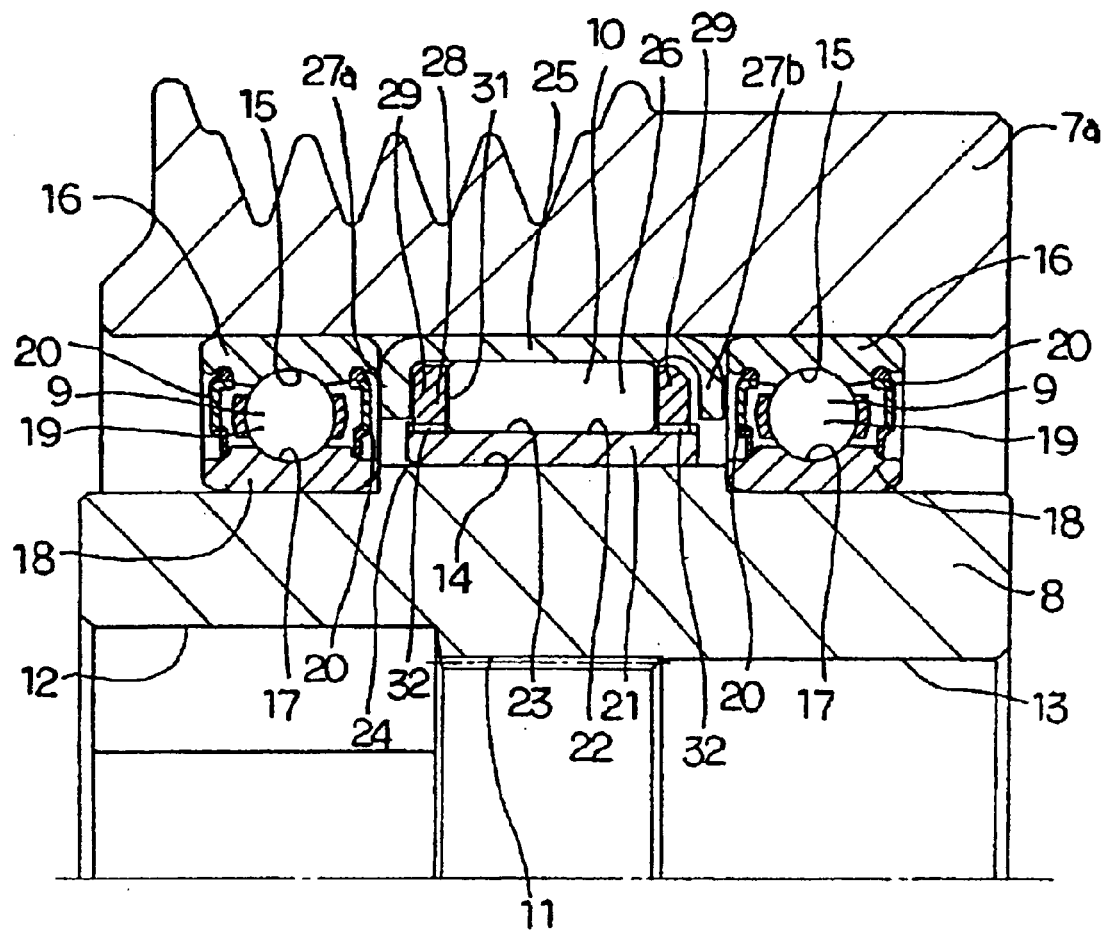
FIG. 2 is a cross sectional view of a half of an example of the conventional structure.
Figure 3:
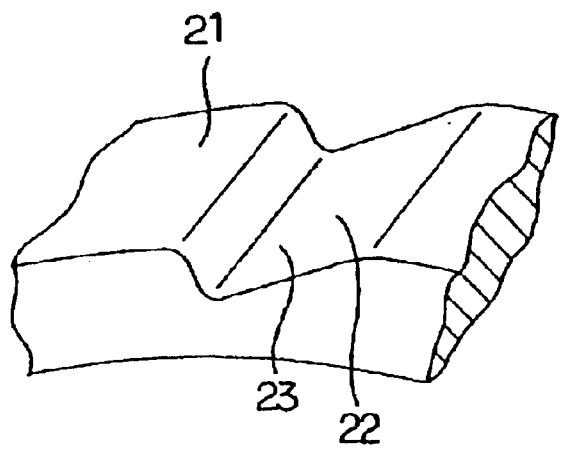
FIG. 3 is a partial perspective view of an inner clutch ring.
Figure 4:
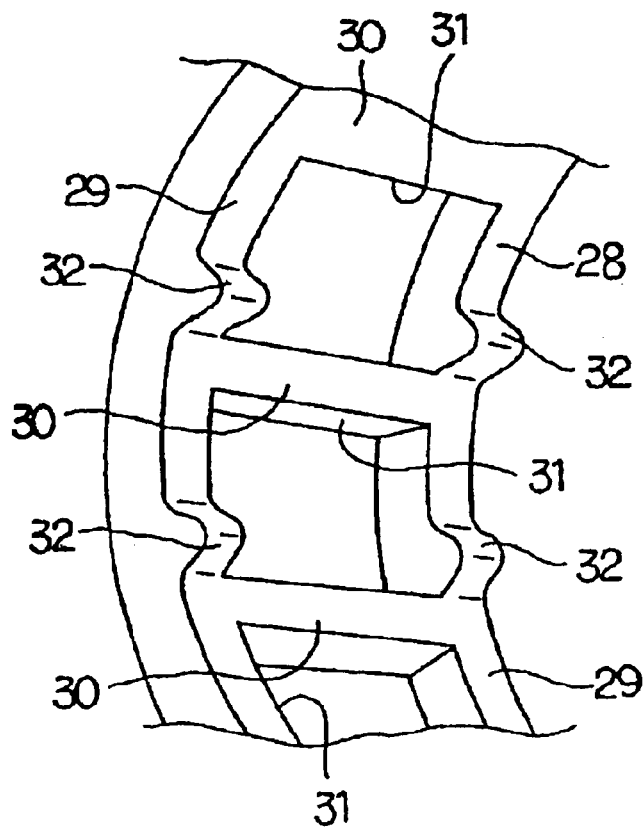
FIG. 4 is a partial perspective view of a clutch retainer.

FIGS. 7 to 11 show a first example of the embodiment of the invention. A feature of this invention is that by preventing rubbing between the clutch retainer 28a and the parts that rotate together with the follower pulley 7a during overrun, it is possible to suppress a rise in temperature due to friction heat and to improve durability, as well as this invention makes it possible to simplify the work of assembling the roller clutch 10a on the inner-diameter side of the follower pulley 7a. The construction and function of the other parts are substantially the same as that of the prior art construction shown in FIGS. 2 to 6, so the like code numbers will be used for like parts and any redundant explanation will be omitted. The following explanation will center on the features of this invention and the parts that differ from the prior construction.

First, the construction of the part, which suppresses displacement in the axial direction of the clutch retainer 28a in order to suppress the rise in temperature, will be explained. This clutch retainer 28a is made of synthetic resin having sufficient elasticity and is formed by injection molding such that on one end in the axial direction (right end in FIG. 7) there is an inward facing flange-shaped fastening rim section 34 that is formed all the way around or intermittently around in the circumferential direction. On the other end in the axial direction of the clutch retainer 28a, there is one to several fastening protrusions 35 formed intermittently around in the circumferential direction to protrude inward in the radial direction. The inner peripheral surface of this fastening protrusions 35 is inclined outward in the radial direction towards the tips, and act as inclined guide surfaces 36. On the other hand, an inner clutch ring 21 of the roller clutch 10a is securely fastened around the outer peripheral surface in the middle section of the rotating member or sleeve 8 through interference fit, and a plurality of stepped sections are formed on the opposite end surfaces in the axial direction of the inner clutch ring 21. Also, the opposite end surfaces in the axial direction of the inner clutch ring 21 are engaged with the mating surfaces of the fastening rim section 34 and the fastening protrusions 35, so that movement in the axial direction of the clutch retainer 28a is suppressed.

Figure 8:
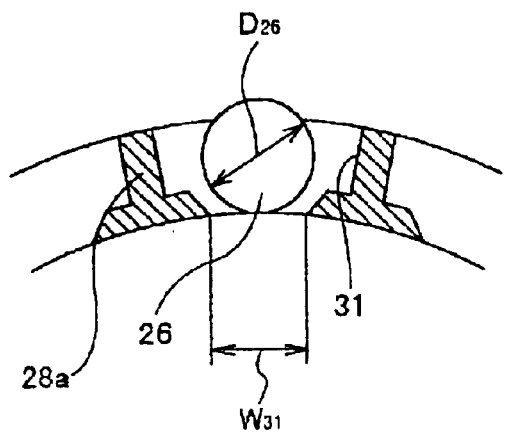
FIG. 8 is a cross sectional view to show an example of the fall-out-prevention means to prevent the rollers from coming off radially inwards from the pockets in the clutch retainer.

Next, FIG. 8 will be used to explain the fall-out-prevention means of preventing the rollers 26 from falling out of the pockets 31 formed in the clutch retainer 28a into the inner-diameter side of the clutch retainer 28a. As shown in FIG. 8, the rollers 26 are held in the pockets 31 that are formed in the clutch retainer 28a such that they can roll freely and move in the circumferential direction of the clutch retainer 28a. However, with respect to the openings of the pockets 31, the width $W_{31}$ in the circumferential direction of the opening on the inner-diameter side of the clutch retainer 28a is less than the diameter $D_{26}$ of the rollers 26 ($W_{31} < D_{26}$). Therefore, the rollers 26 cannot pass through the openings on the inner-diameter side of the clutch retainer 28a, and thus the rollers 26 do not fall into the inner-diameter side of the clutch retainer 28a.

Figure 9:
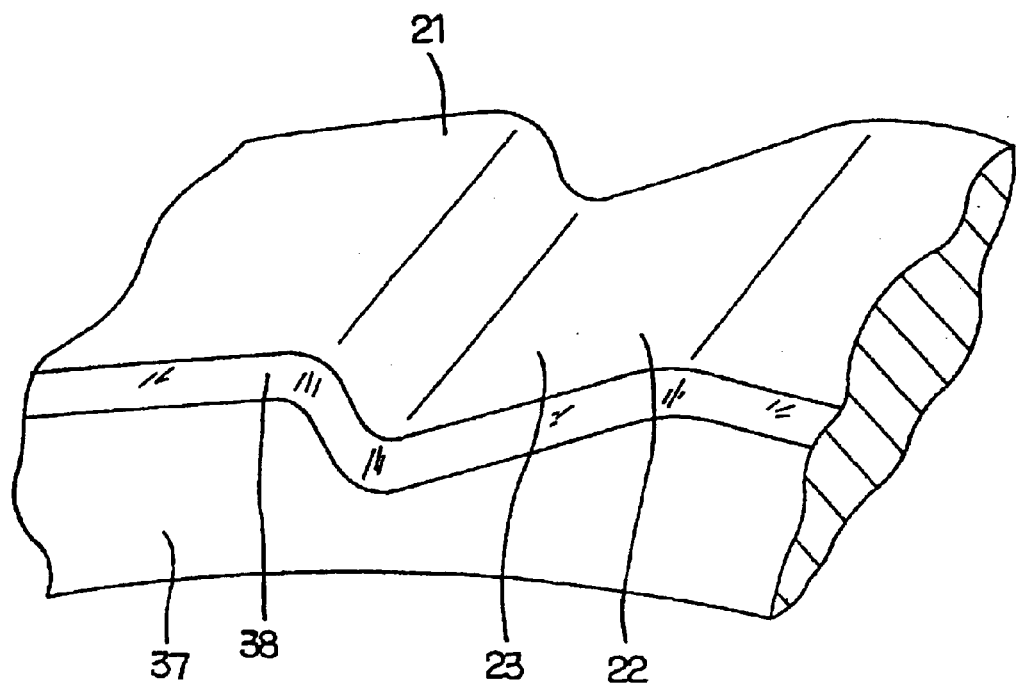
FIG. 9 is a partial, enlarged perspective view to show a chamfered portion on the outer peripheral edge at one end of the inner clutch ring.
Figure 10:
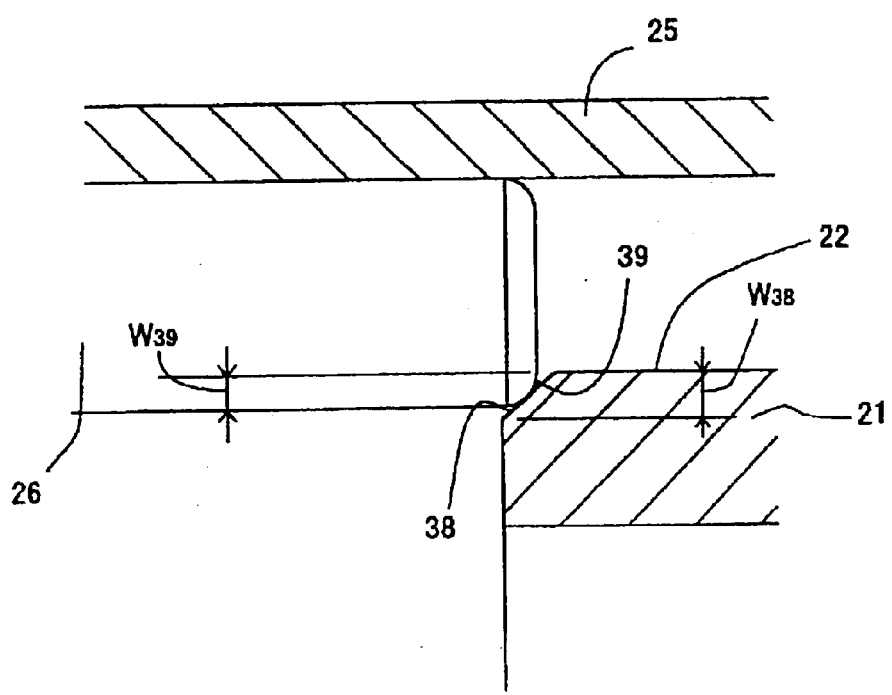
FIG. 10 is a cross sectional view to show an engagement state of a chamfered portion on the outer peripheral edge at one end of the inner clutch ring and rollers.
Figure 11:
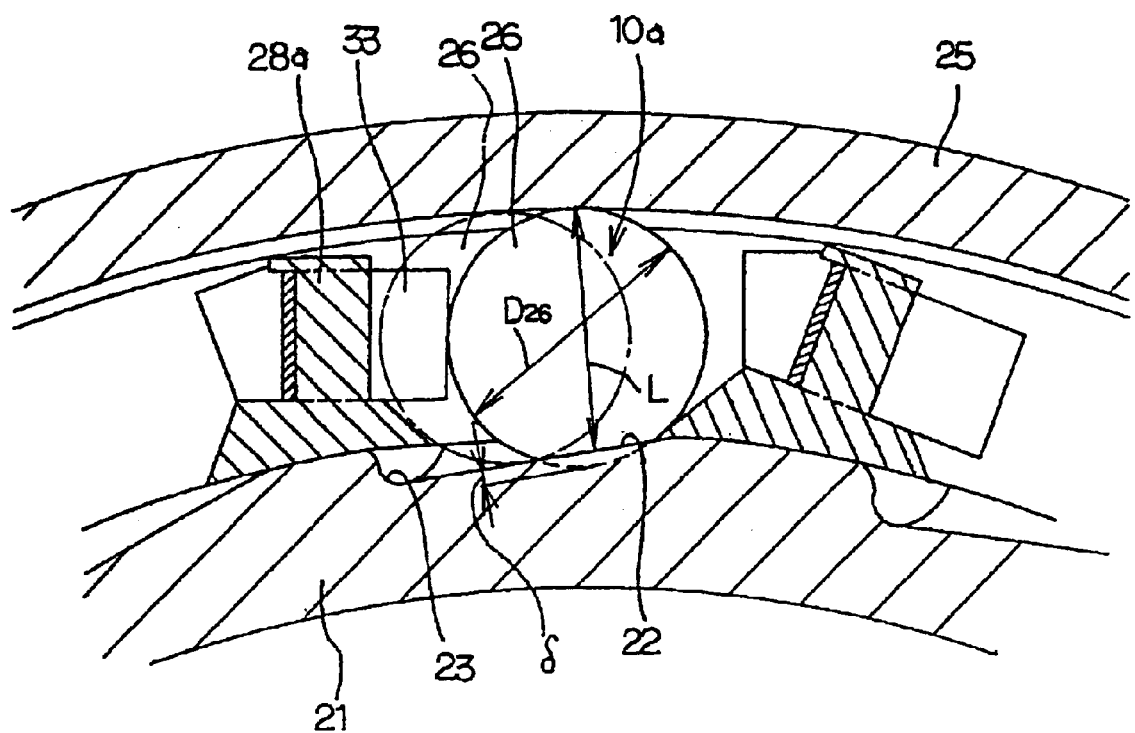
FIG. 11 is a view, seen from an side in FIG. 7, of the location relation between the inner clutch ring and rollers before the inner clutch ring is pushed on the inner-diameter side of the rollers.

Next, FIGS. 9 to 11 will be used to explain about the chamfered sections that are formed on the outer peripheral edge on one end in the axial direction of the inner clutch ring 21 and the ends in the axial direction of the rollers so that the inner clutch ring 21 can be inserted into the inner-diameter side of the rollers 26. First, as shown in FIG. 9, a chamfered section 38 is formed all the way around the outer peripheral edge of one end surface in the axial direction of the inner clutch ring 21 such that it connects the cam surface 22 that is formed on the outer peripheral surface of the inner clutch ring 21 to the end surface 37 in the axial direction of the inner clutch ring 21. This chamfered section 38 is inclined inward in the radial direction from the cam surface 22 to the end surface 37.

On the other hand, as shown in FIG. 10, there is a chamfered convex section 39, having a quarter arch-shaped or partial conical-shaped cross section, formed on the ends in the axial direction of the rollers 26.

These chamfered sections 38, 39 act as guiding surfaces when bringing the inner clutch ring 21 together with the rollers 26 closer to each other in an axial direction in order to place the rollers 26 around the inner clutch ring 21, or in other words, to place the inner clutch ring 21 on the inner-diameter side of the rollers 26, so that the rollers 26 are moved in the circumferential direction against the force of the springs 33 by the cam surface 22. In other words, when pushing the inner clutch ring 21 into the inner-diameter side of the rollers 26 in order to place the inner clutch ring 21 on the inner-diameter side of the rollers 26, due to the engagement between the chamfered sections 38, 39, it is possible to push the inner roller-clutch ring 21 into the inner-diameter side of the rollers 26 with no interference between the outer peripheral edge on the ends in the axial direction of the rollers 26 and the outer peripheral edge on the ends in the axial direction of the inner roller-clutch ring 21.

Figure 5:
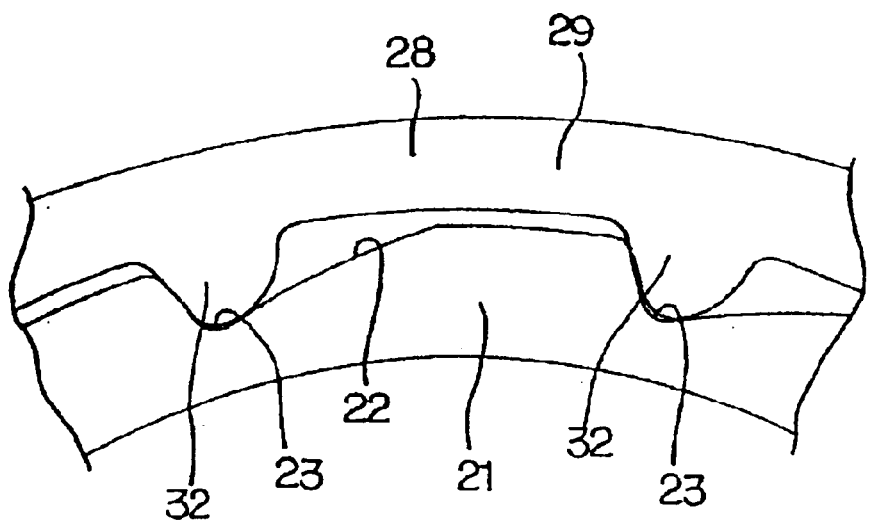
FIG. 5 is a partial side elevational view of the inner clutch ring and the clutch retainer with the other parts away.
Figure 6:
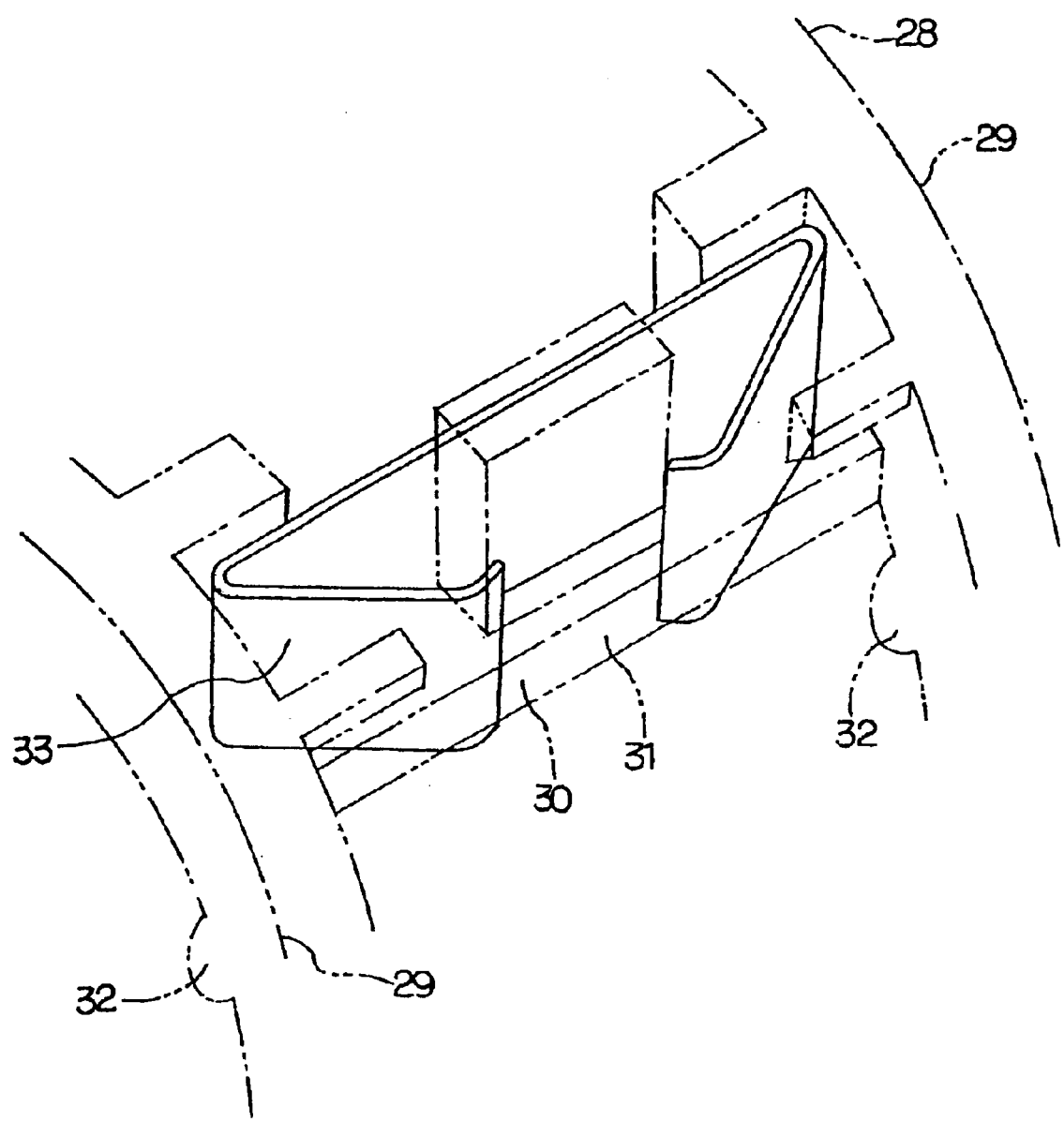
FIG. 6 is a perspective view of an example of the spring mounted to a clutch retainer.

In order to accomplish this, the amount of chamfering of the chamfered sections 38, 39, that is, the total width $W_{38}$ and $W_{39}$ in the radial direction of these chamfered sections 38, 39 is regulated as described below by the relationship with the rollers 26 and the inner clutch ring 21. In other words, in the initial step of pushing the inner clutch ring 21, the end in the axial direction of the inner clutch ring 21 is inserted into the end in the axial direction of the clutch retainer 28a, in order that the concave sections 23 of the cam surface 22 on the outer peripheral surface of the inner roller-clutch ring 21 are engaged with the fitting protrusions 32 that are formed on the inner peripheral surface of the clutch retainer 28a, as shown in FIG. 5. In this state, the phase in the circumferential direction of the inner clutch ring 21 and the clutch retainer 28a is regulated (relative rotation of these parts 21, 28a is not possible). However, in this initial step, the rollers 26 and the inner clutch ring 21 are still separated in the axial direction. Also, these rollers 26 are pressed by the springs 33, with respect to the phase in the circumferential direction, to be moved to the section where the depth of the concave sections 23 becomes shallow (sections where the gap between the outer peripheral surface of the inner clutch ring 21 and the inner peripheral surface of the outer clutch ring 25 is narrower).

In this state, as shown in FIG. 11, part of these rollers 26 are located further inward in the radial direction than the part on the outer peripheral surface of the inner clutch ring 21 which matches the rollers 26 in the phase in the circumferential direction, even when the spring force of the springs that presses the rollers 26 has a component force outward in the radial direction of the clutch retainer 28a so that the rollers 26 are brought into contact with the inner peripheral surface of the inner clutch ring 25. In other words, part of the inner clutch ring 21 overlaps part of the rollers 26 in the axial direction. In this state, when the amount that these parts 26, 21 overlap is taken to be δ, the total width $W_{38}$ and $W_{39}$ in the radial direction of the chamfered sections 38, 39 is greater than the amount of overlap δ ($W_{38}+W_{39} > δ$). As long as this relationship ($W_{38}+W_{39} > δ$) is satisfied, either one of these widths $W_{38}$ and $W_{39}$ can be '0'. By regulating the size of the chamfered sections 38, 39 in this way, the inner clutch ring 21 is pushed into the inner-diameter side of the clutch retainer 28a and rollers 26 that are located beforehand on the inner peripheral surface of the outer clutch ring 25.

Figure 12:
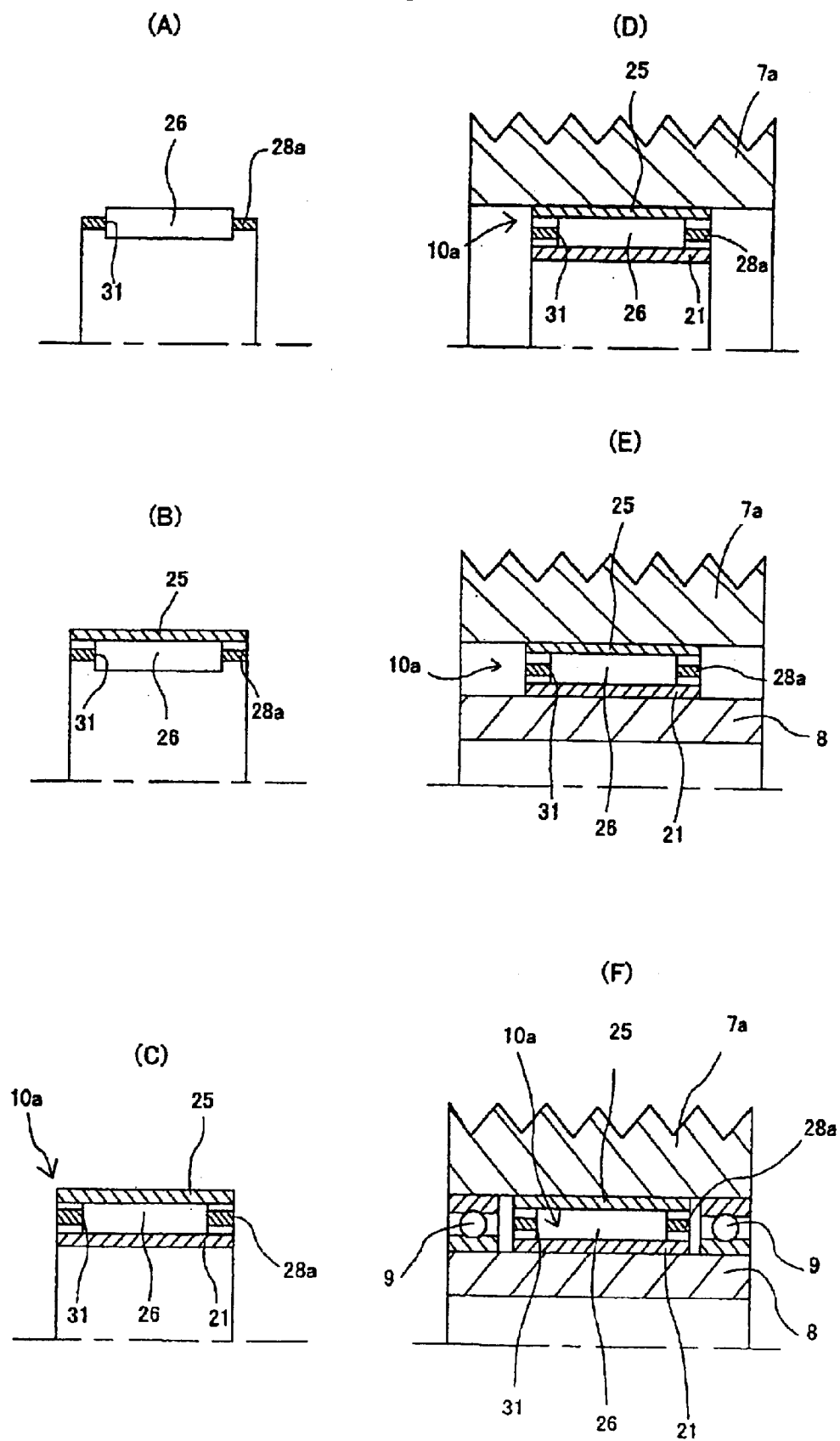
FIG. 12 show schematic cross sectional views to show an example of the assembly process of the pulley apparatus with built-in roller clutch according to a first example of the embodiment.

The work of assembling the pulley apparatus with built-in roller clutch of this invention, which is constructed with the components described above, is performed, for example, as shown in FIG. 12. First, as shown in FIG. 12(A), the springs 33 (see FIGS. 6 and 11) are mounted in the clutch retainer 28a, and the rollers 26 are held in the pockets 31 that are formed in the clutch retainer 28a. In this state, the rollers 26 are pushed to one end in the circumferential direction of the pockets 31 by the springs 33. Then, as shown in FIG. 12(B), the rollers 26, springs 33 and clutch retainer 28a are assembled on the inner-diameter side of the outer clutch ring 25. In this state, the rollers 26 are prevented from falling into the inner-diameter side of the clutch retainer 28a by the fall-out-prevention means as shown in FIG. 8.

Then, as shown in FIG. 12(C), the inner clutch ring 21 is assembled into the inner-diameter side of the rollers 26. When assembling this inner clutch ring 21, first, the fitting section or the fitting protrusions 32 is engaged with the concave section 23 on the fitted section or the cam surface 22 between one end in the axial direction of the clutch retainer 28a and one end in the axial direction of the inner clutch ring 21 as shown in FIG. 5, so that the inner clutch ring 21 is prevented from rotating relative to the clutch retainer 28a. In other words, the phase in the circumferential direction of these parts 21, 28a is to be in the normal state (assembled state). In this state, one end in the axial direction of the inner clutch ring 21 is not yet inserted into the inner-diameter side of the end section of the rollers 26.

With the one end in the axial direction of the clutch retainer 28a inserted into the one end section in the axial direction of the inner clutch ring 21 and with the phase in the circumferential direction of both of these parts 28a, 21 regulated in this way, the inner clutch ring 21 is pushed into the inner-diameter side of the springs 33 and the rollers 26 in order to assemble the inner clutch ring 21 in the inner-diameter side of the rollers 26, which are held by the clutch retainer 28a. When pushing the inner clutch ring 21, the chamfered sections 38, 39 that are formed on the ends in the axial direction of the inner clutch ring 21 and rollers 26 function as guide surfaces. Therefore, the work of pushing the inner clutch ring 21 into the inner-diameter side of the rollers 26 is not particularly troublesome and can be performed smoothly.

At the instant that the work of pushing in the inner clutch ring 21 begins, the phase in the circumferential direction of the inner clutch ring 21 and the rollers 26 is as shown in FIG. 11. As can be clearly seen from FIG. 11, with the phase of the rollers 26 in the circumferential direction of the inner clutch ring 21 as is, it is not possible to push in the inner clutch ring 21. The reason for this is that for the portion that coincides with the rollers 26 with reference to the phase in the circumferential direction of the inner clutch ring 21, the distance L between the cam surface 22 that is formed on the outer peripheral surface of the inner clutch ring 21 and the inner peripheral surface of the outer clutch ring 25 is less than the diameter $D_{26}$ of the rollers 26 ($L<D_{26}$). However, when the inner clutch ring 21 is pushed further into the inner-diameter side of the roller 26, the cam surface 22 that is formed on the outer peripheral surface of the inner clutch ring 21 moves the rollers 26 in the circumferential direction against the force of the springs 33. This cam surface 22 includes the chamfered section 38 that is formed on the end in the axial direction of the clutch inner ring 21.

In other words, at the same time that the end section in the axial direction of the inner clutch ring 21 is pushed into the inner-diameter side of the rollers 26 due to the engagement of the chamfered sections 38, 39, the inclined surfaces of the concave sections 23 of the cam surface 22 press the rollers 26 in directions perpendicular to these inclined surfaces. Also, of the force in this perpendicular direction, the component force in the circumferential direction of the inner clutch ring 21 moves the rollers 26 against the force of the springs 33, as shown by the dotted line in FIG. 11, to a specified position in the circumferential direction between the inner peripheral surface of the outer clutch ring 25 and the outer peripheral surface of the inner clutch ring 21, or in other words, to the place where the distance between both of these peripheral surfaces coincides with the diameter $D_{26}$ of the rollers 26. In this state, assembly of the roller clutch 10a itself is complete. Pushing the inner clutch ring 21 into the inner-diameter side of the clutch retainer 28a is performed from the side of the fastening protrusion 35 (see FIG. 7) that are formed on the other end in the axial direction of the clutch retainer 28a. When pushing the inner clutch ring 21 in, this fastening protrusion 35 is elastically deformed outward in the radial direction.

As shown in FIG. 12(D), the roller clutch 10a that is assembled in this way is assembled on the inner peripheral surface of the middle section in the axial direction of the follower pulley 7a by securely attaching the outer clutch ring 25 into the follower pulley 7a through interference fit. Then, as shown in FIG. 12(E), by attaching the inner clutch ring 21 onto the sleeve 8 through interference fit, the roller clutch 10a is assembled on the outer peripheral surface of the middle section in the axial direction of the sleeve 8. In this state, the roller clutch 10a is assembled between the inner peripheral surface of the middle section of the follower pulley 7a and the outer peripheral surface of the middle section of the sleeve 8.

Figure 7:
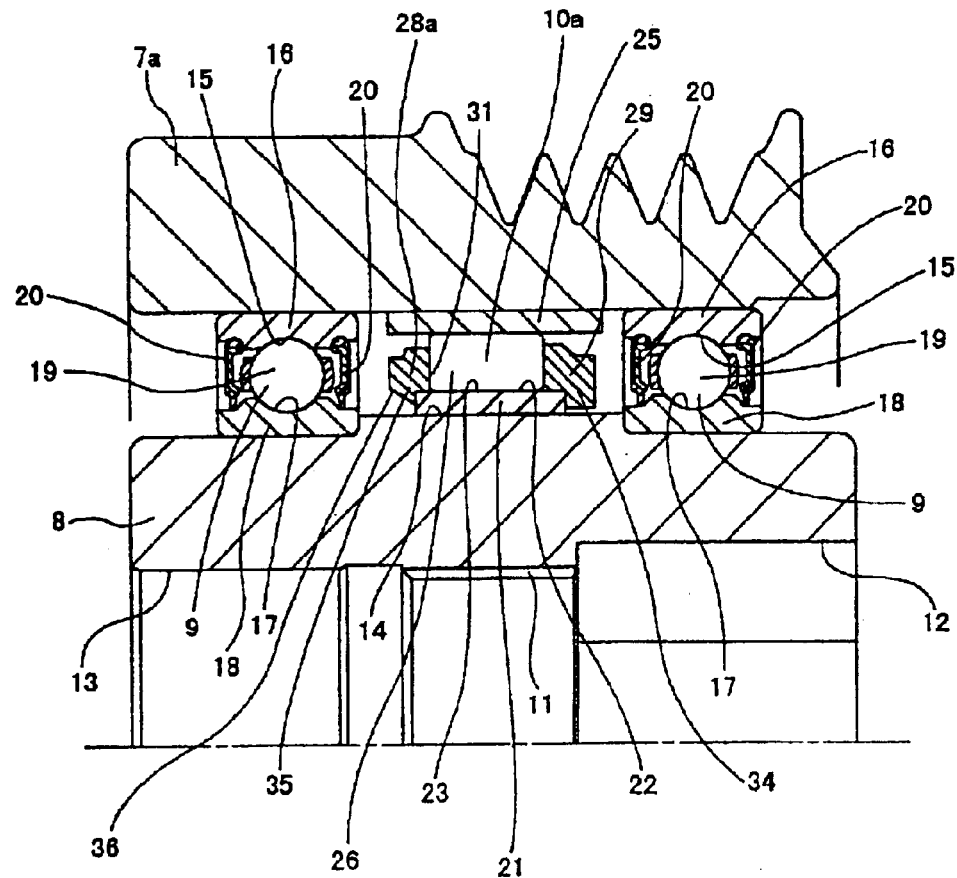
FIG. 7 is a cross sectional view of a half of a first example of the embodiment of the pulley apparatus with built-in roller clutch according to the present invention.

Finally, as shown in FIG. 12(F), the first and second ball bearings 9 are assembled on the opposite sides in the axial direction of the roller clutch 10a between the inner peripheral surface of the follower pulley 7a and the outer peripheral surface of the sleeve 8 at the opposite ends in the axial direction thereof. In this state, the pulley apparatus with built-in roller clutch is complete as shown in FIG. 7.

A feature of the assembly method of this invention is in the process of assembling the inner clutch ring 21 on the inner-diameter side of the clutch retainer 28a, the rollers 26 and springs 33 which have already been assembled on the inner-diameter side of the outer clutch ring 25, in order to assemble the roller clutch 10a. The other processes can be changed and performed as suitable and not limited to the order shown in FIG. 12. For example, it is possible to assemble the clutch retainer 28a, rollers 26, springs 33 and inner clutch ring 21 on the inner-diameter side of the outer clutch ring 25 that has already been fitted and attached into the inner peripheral surface in the middle section in the axial direction of the follower pulley 7a. Furthermore, with respect to the pair of ball bearings 9, one of the ball bearings 9 can be assembled between the inner peripheral surface of the follower pulley 7a and the outer peripheral surface of the sleeve 8 before assembling the roller clutch 10a.

Figure 13:
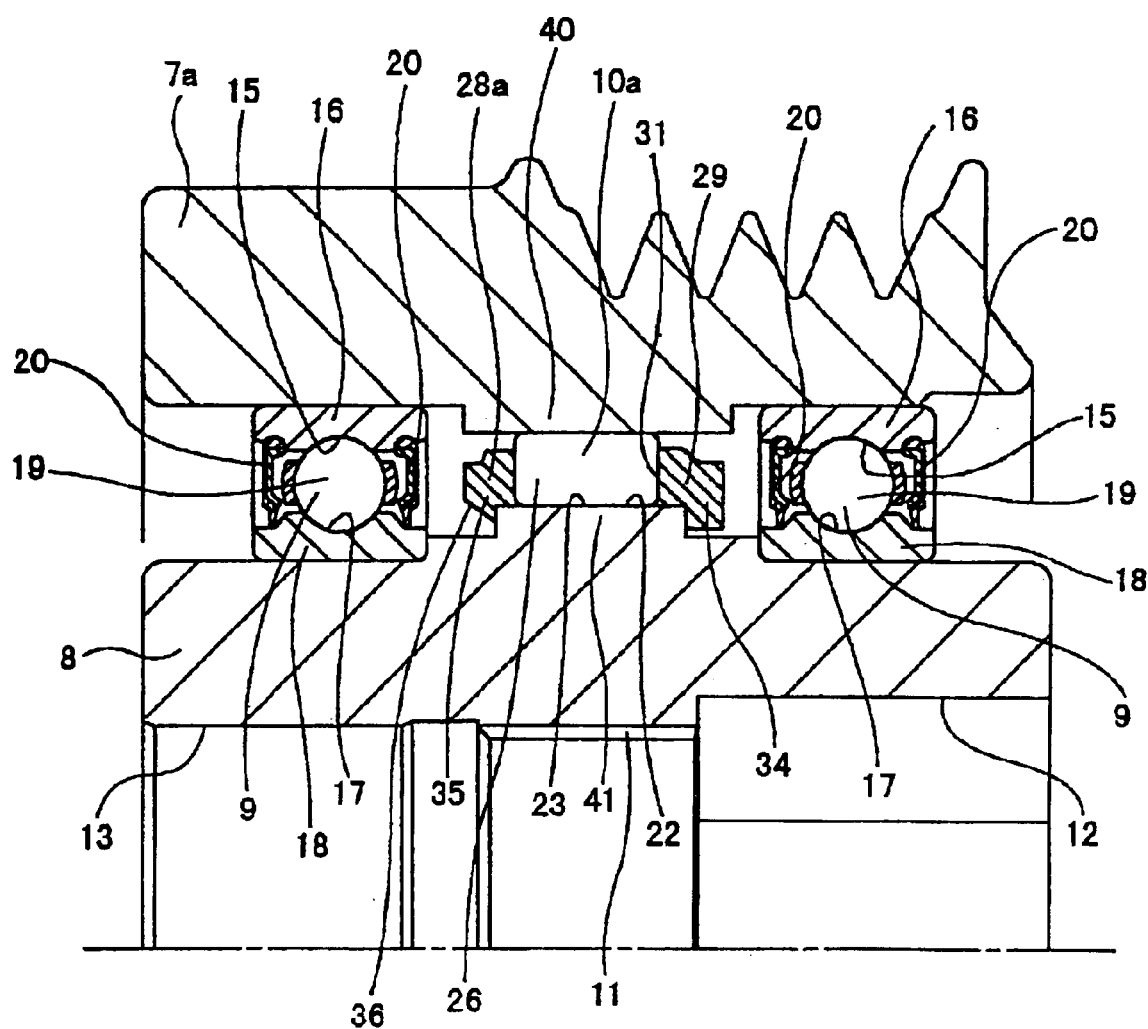
FIG. 13 is a cross sectional view of a half of a second example of the embodiment of the pulley apparatus with built-in roller clutch of the present invention.

Next, FIG. 13 shows a second example of the embodiment of the invention. In this example, the like of outer clutch ring 40 of the roller clutch 10a is integrated with the follower pulley 7a, and the like of inner clutch ring 41 is integrated with the sleeve 8, respectively as a single body.

Figure 14:
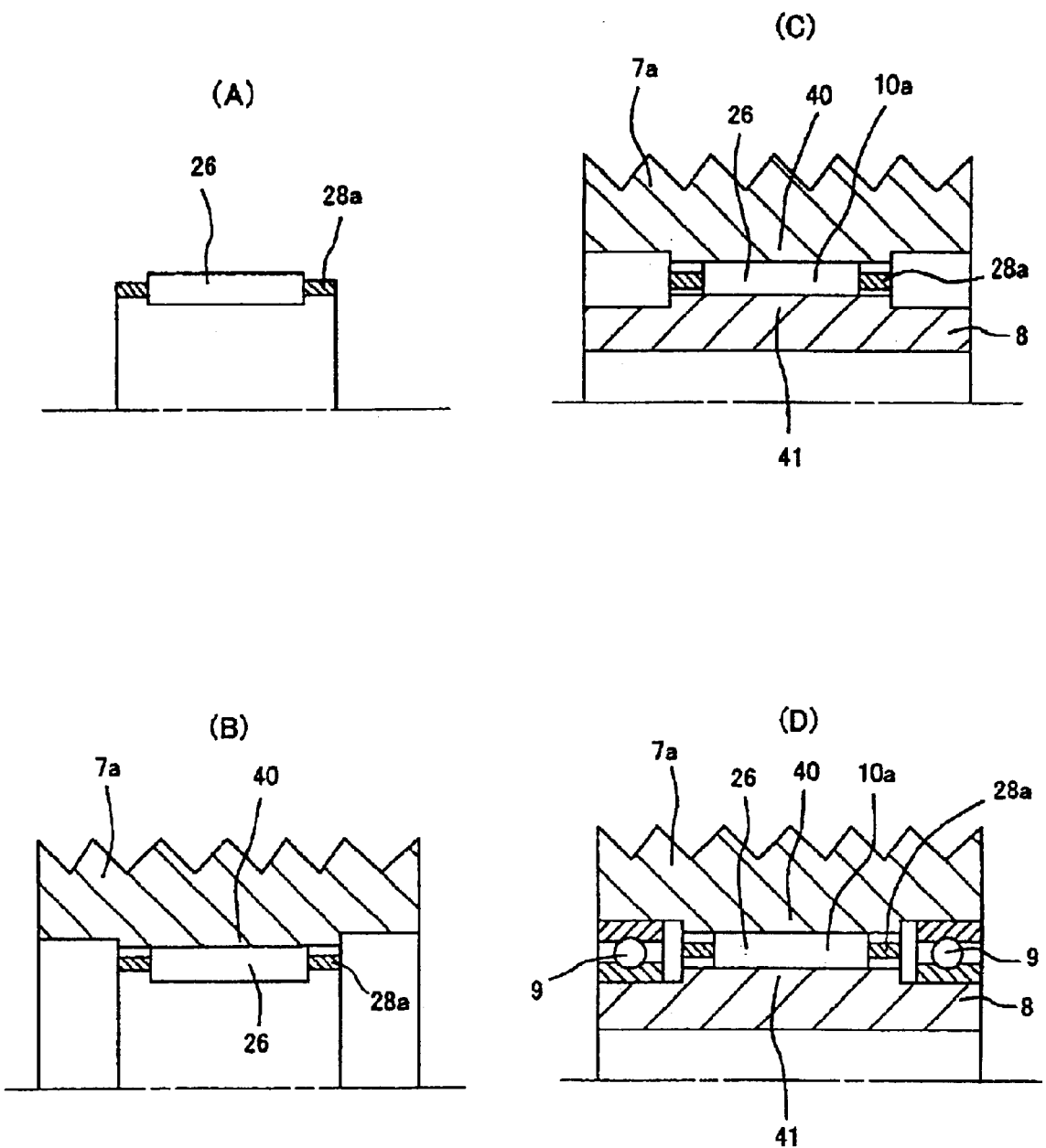
FIG. 14 shows schematic cross sectional views to show an example of the assembling process of the puller apparatus with built-in roller clutch according to the second example of the present embodiment.

When assembling this embodiment, the rollers 26 and springs are assembled in the clutch retainer 28a as shown in FIG. 14(A), and then these parts are assembled on the inner-diameter side of the like of outer clutch ring 40 as shown in FIG. 14(B). Next, as shown in FIG. 14(C), the like of inner clutch ring 41 is assembled on the inner-diameter side of the rollers 26 to form the roller clutch 10a, after which the pair of ball bearings 9, 9 are assembled on both side of the roller clutch 10a as shown in FIG. 14(D).

The construction and function of the other parts are substantially the same as in the first example described above, so any redundant figures or explanations are omitted.

Next, FIGS. 15 to 18 show third to sixth examples of the embodiments of the invention.

Figure 15:
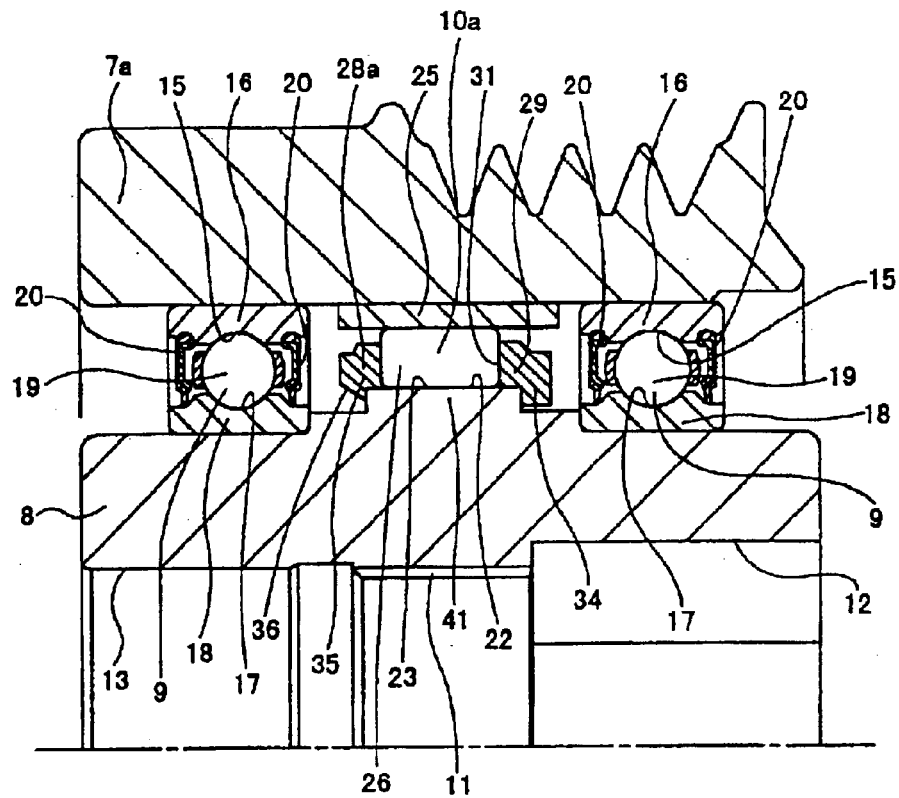
FIG. 15 is a cross sectional view of a half of a third example of the embodiment of the pulley apparatus with built-in roller clutch of the present invention.

First, in the case of the third example shown in FIG. 15, the outer clutch ring 25 is attached on the inner peripheral surface of the middle section in the axial direction of the follower pulley 7a, and the like of inner clutch ring 41 is integrated with and formed on the outer peripheral surface of the middle section in the axial direction of the sleeve 8.

Figure 16:
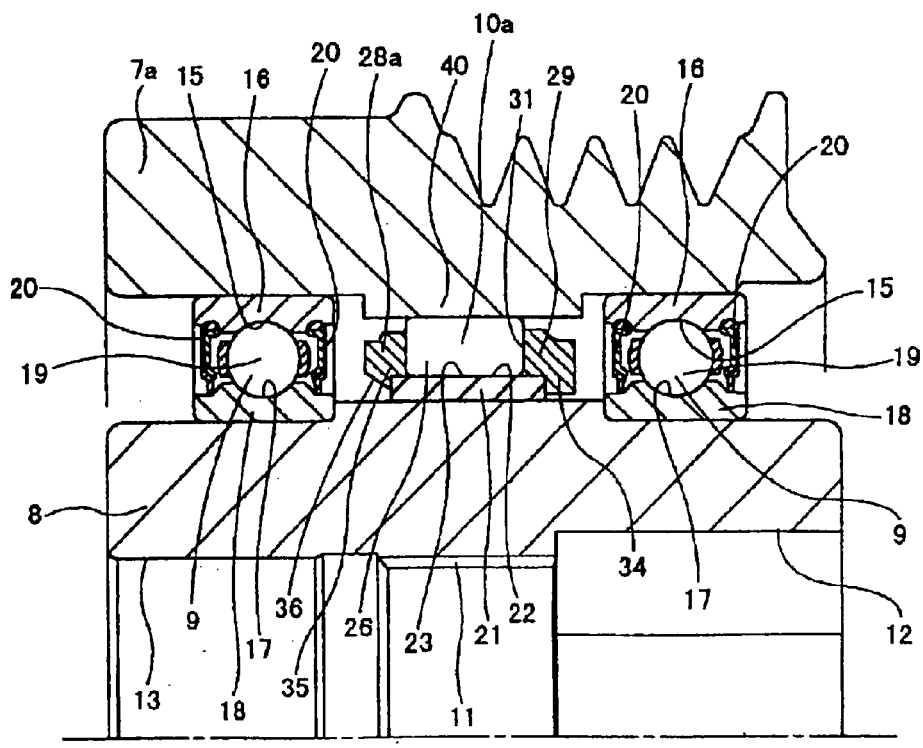
FIG. 16 is a cross sectional view of a half of a fourth example of the embodiment of the pulley apparatus with built-in roller clutch of the present invention.

Next, in the case of the fourth example shown in FIG. 16, the inner clutch ring 21 is fitted and attached onto the outer peripheral surface of the middle section in the axial direction of the sleeve 8, and the like of outer clutch ring 40 is integrated with and formed around the inner peripheral surface of the middle section in the axial direction of the follower pulley 7a.

Figure 17:
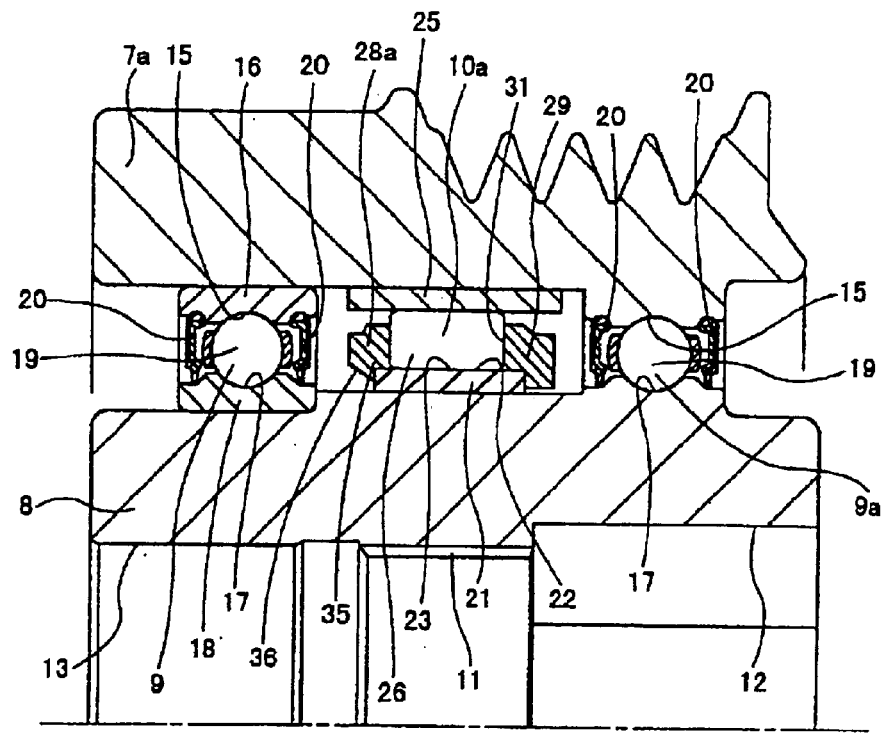
FIG. 17 is a cross sectional view of a half of a fifth example of the embodiment of the pulley apparatus with built-in roller clutch of the present invention.

Next, in the case of the fifth example shown in FIG. 17, the like of the inner race of the ball bearing 9a, that corresponds to the first ball bearing, is integrated with the sleeve 8, and similarly, the like of the outer race is integrated with the follower pulley 7a.

Figure 18:
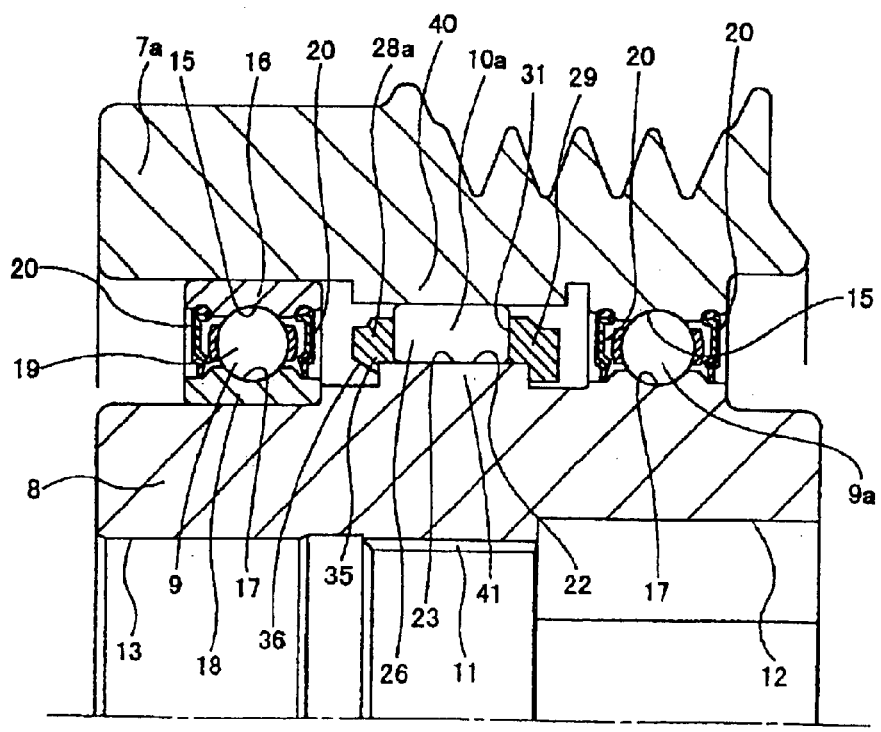
FIG. 18 is a cross sectional view of a half of a sixth example of the embodiment of the pulley apparatus with built-in roller clutch of the present invention.

Furthermore, in the case of the sixth example shown in FIG. 18, the like of the outer clutch ring 40 of the roller clutch 10a is integrated with the follower pulley 7a, and the like of the inner clutch ring 41 is integrated with the sleeve 8, and the like of the inner race of the ball bearing 9a, that corresponds to the first ball bearing, is integrated with the sleeve 8, and similarly the like of the outer race is integrated with the follower pulley 7a.

The construction and function of the other parts of the third to sixth examples are substantially the same as in the first and second examples described above so any redundant figures or explanations are omitted.

Figure 19:
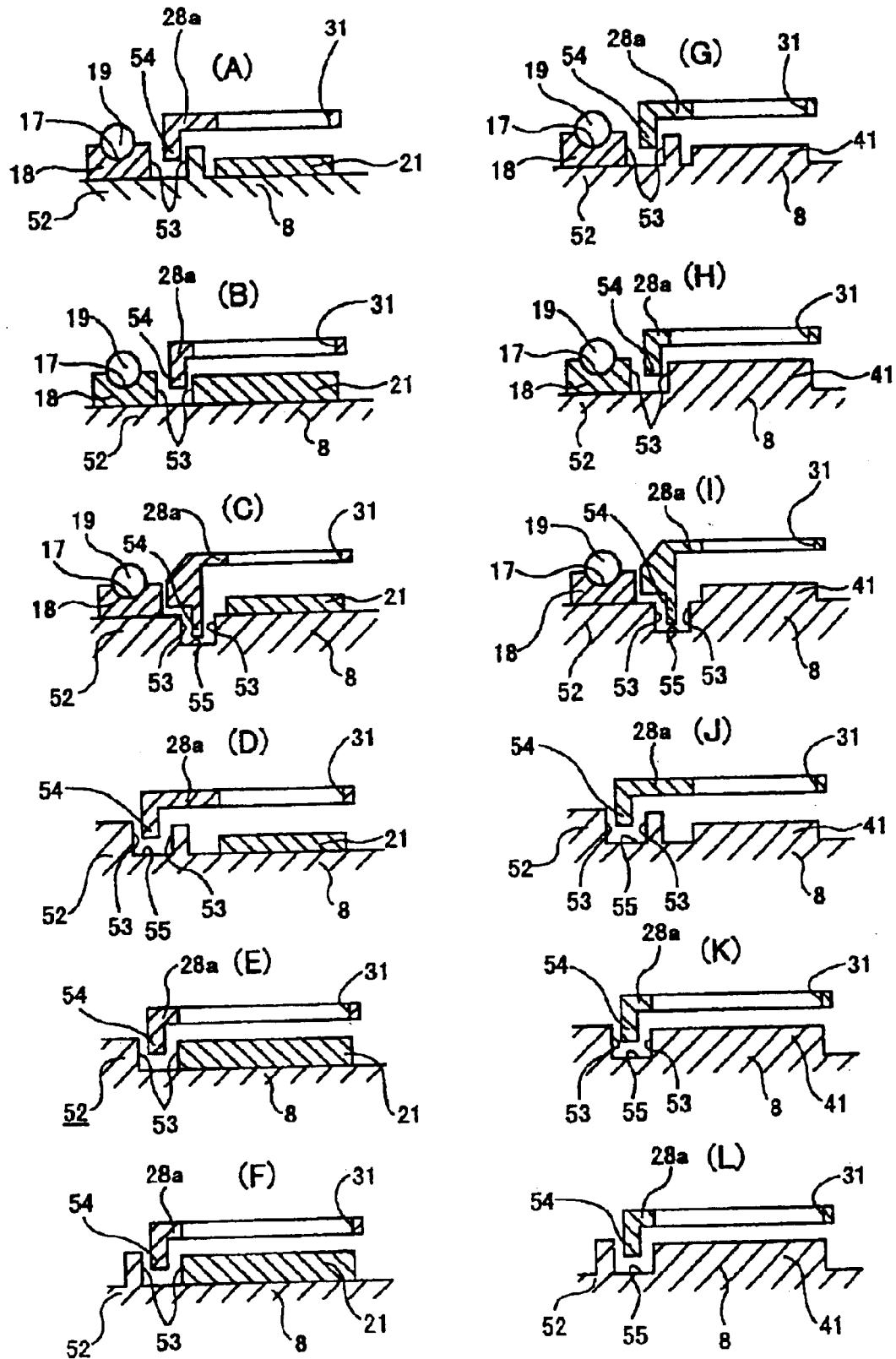
FIG. 19 shows brief cross sectional views of another twelve examples of the structure of a portion to suppress axial displacement of the clutch retainer.
Figure 20:
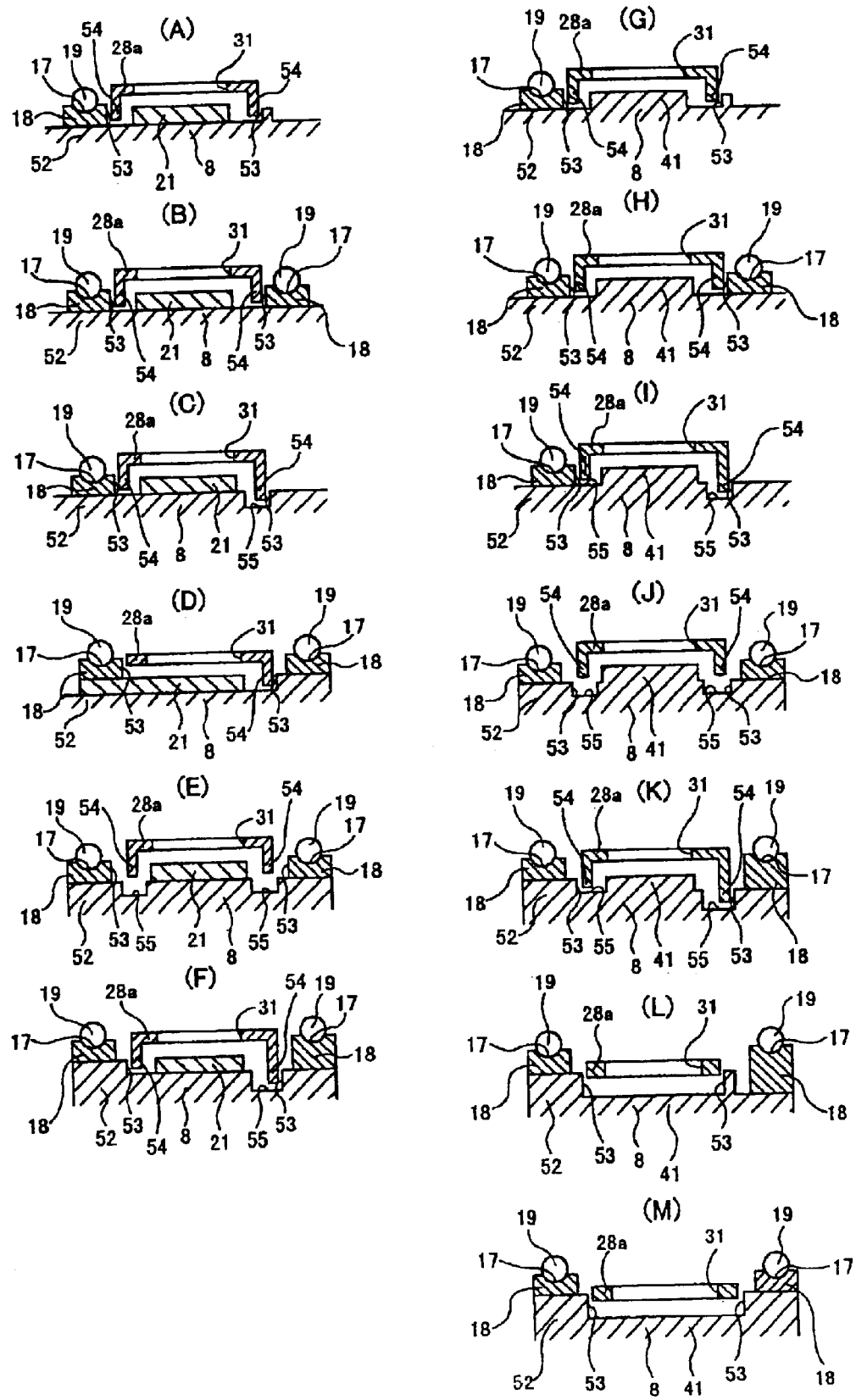
FIG. 20 shows brief cross sectional views of another thirteen examples.
Figure 21:
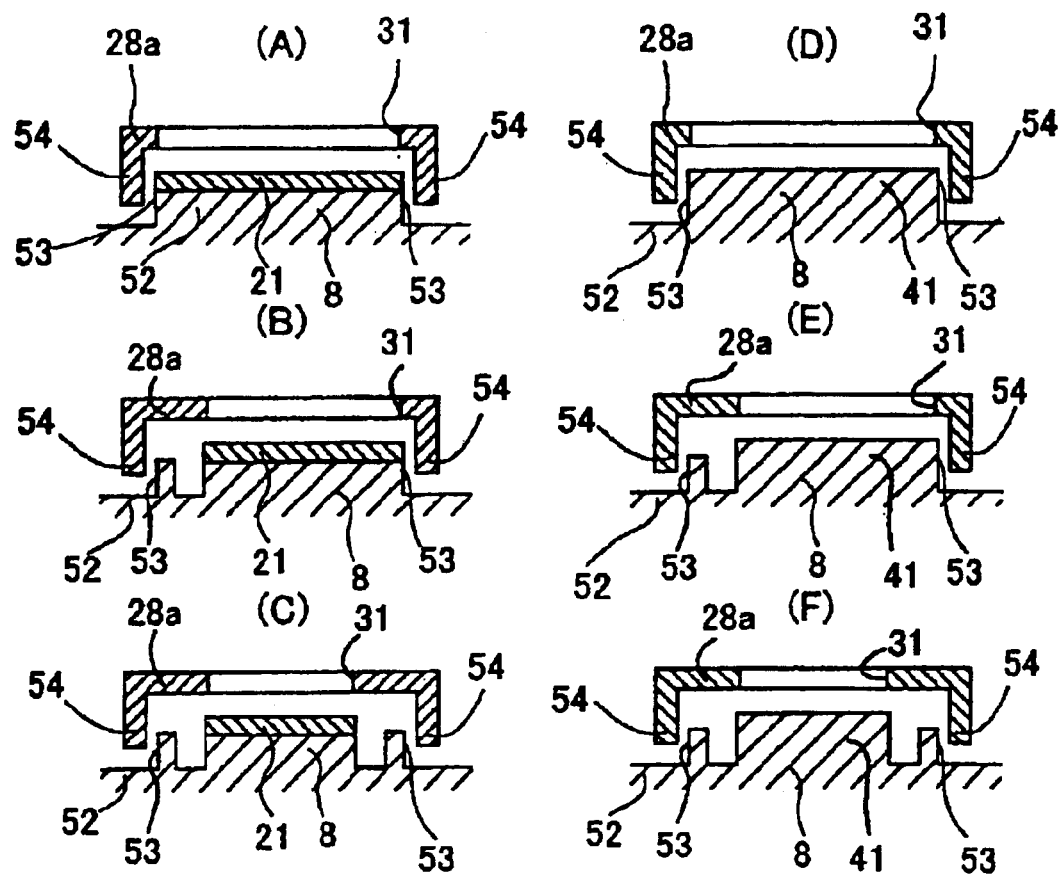
FIG. 21 shows substantial cross sectional views of another six examples.

Next, FIGS. 19 to 21 are used to explain a different example of the construction of the section that suppresses displacement in the axial direction of the clutch retainer 28a by engaging part of the clutch retainer 28a with a plurality of step sections 53 that are formed around the outer peripheral surface of the rotating-shaft unit 52 wherein the inner race 18 of at least one of the ball bearings 9 (9a) of the rotating-shaft unit 52 is fitted onto or integrally formed on the rotating-shaft member 8. The step sections 53 that are formed around the outer peripheral surface of the rotating-shaft unit 52, include the integrated step sections 53 that protrude from the outer peripheral surface of the rotating-shaft unit 52 (for example as shown in FIG. 19(A)), the side surfaces 53 of the concave grooves 55 that are formed on the outer peripheral surface of the rotating-shaft member 8 (for example as shown in FIG. 19(C)), as well as the end surfaces 53 in the axial direction of the inner clutch ring 21 (the like 41 of inner clutch ring) that is fitted and fastened onto the rotating-shaft member 8 and the inner bearing race 18 of the ball bearing 9 (9a) (for example as shown in FIG. 19(B)).

Figure 22:
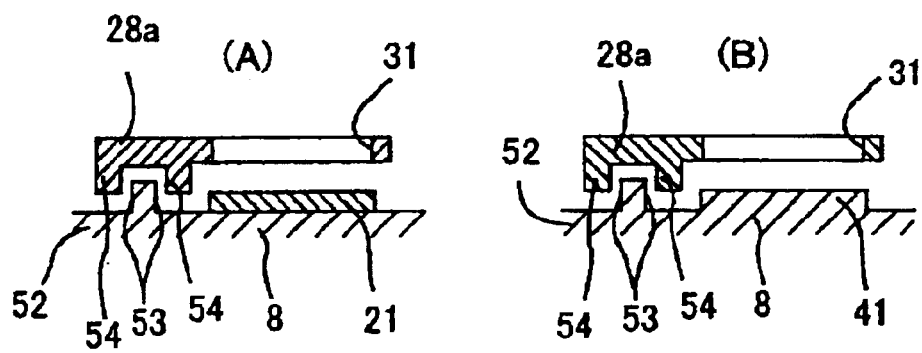
FIG. 22 shows substantial cross sectional views of another two examples.

Of the construction for suppressing movement in the axial direction of the clutch retainer 28a using this kind of step section 53, FIGS. 19(A) to 19(L) show a fastening section 54 that is bent inward in the radial direction from one end in the axial direction of the clutch retainer 28a such that it is located between a pair of step sections 53; FIG. 20(A) to FIG. 20(M) show both ends in the axial direction of the clutch retainer 28a (including the fastening sections 54 that are bent inward in the radial direction from these ends) such that they are located between a pair of step sections 53; FIG. 21(A) to FIG. 21(F) show a pair of step sections 53 that are held between a pair of fastening sections 54 that are bent inward in the radial direction from both ends in the axial direction of the clutch retainer 28a; and FIG. 22(A) and FIG. 22(B) show a step section 53 that are held between a pair of fastening sections 54 that protrude inward in the radial direction and are formed on one end in the axial direction of the clutch retainer 28a.

Next, FIG. 23 to FIG. 29 are used to explain a different example of the fall-out-prevention means of preventing the rollers 26 that are held in the pockets 31 of the clutch retainer 28a from falling from the pockets 31 into the inner-diameter side of the clutch retainer 28a.

Figure 23:
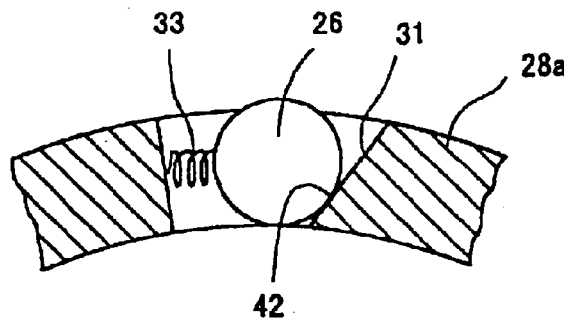
FIG. 23 is a brief cross sectional view of a second example of the fall-out-prevention means to prevent the rollers from coming off radially inwards from the pockets of the clutch retainer.

First, FIG. 23 shows a spring 33 that presses the roller 26 against the inclined surface 42 of the inner surface of the pocket 31 and applies an elestic force on the roller 26 outward in the radial direction of the clutch retainer 28a.

Figure 24:
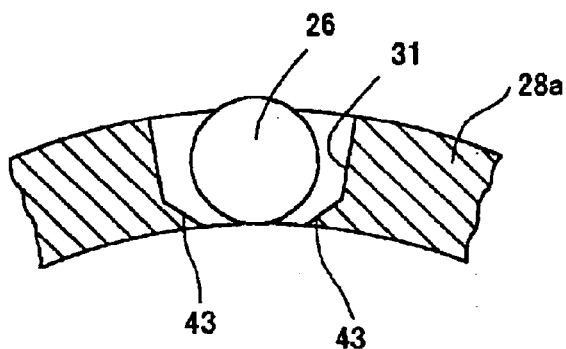
FIG. 24 is a schematic cross sectional view of a third example of the fall-out-prevention means.

Also, FIG. 24 shows protruding tabs 43 that are formed on the opening of the inner-diameter side of the pocket 31 such that the distance between the tips of these tabs 43, 43 is less than the diameter of the roller 26.

Figure 25:
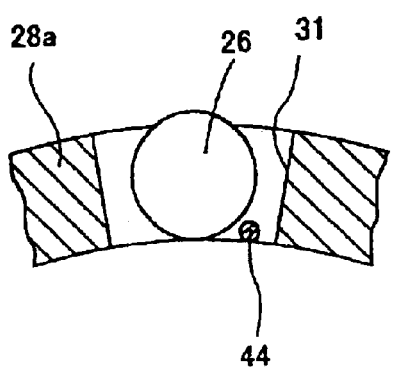
FIG. 25 shows a fourth example of the fall-out-prevention means, wherein (A) is a schematic cross sectional view, and (B) is a view seen from the lower side of (A) with rollers omitted.
Figure 25:
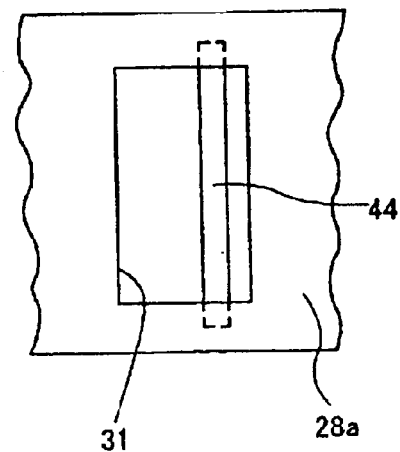

Also, FIG. 25 shows a filament type of wire material 44 that runs across the pocket 31 in the axial direction near the inner diameter side of the clutch retainer 28a, and the distance between this wire material 44 and the mating surface of the pocket 31 is less than the diameter of the roller 26.

Figure 26:
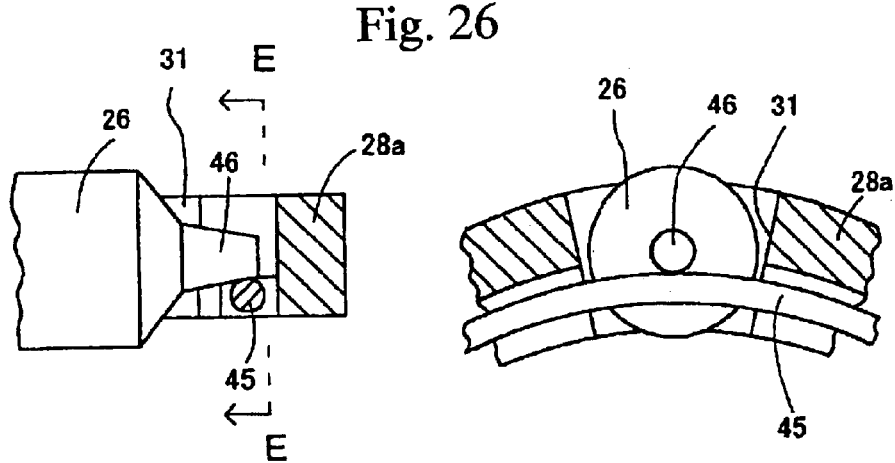
FIG. 26 shows a fifth example of the fall-out-prevention means, wherein (A) is a schematic cross sectional view, and (B) is a cross sectional view taken along the line E—E in (A).

FIG. 26 shows mounting a wire ring 45 on the inner peripheral surface of the opposite ends of the clutch retainer 28a, and also forming a protrusion 46 on the opposite ends of the roller 26, such that displacement of the roller 26 in the radial direction of the clutch retainer 28a is suppressed by the engagement between the wire ring 45 and the protrusion 46.

Figure 27:
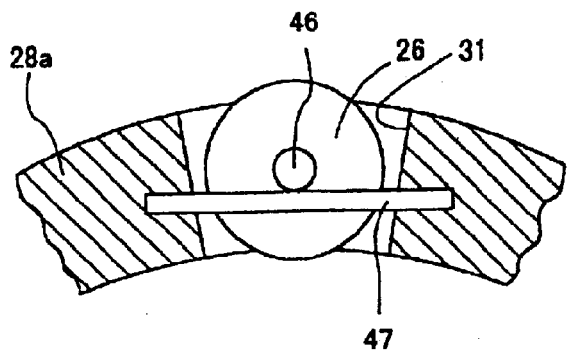
FIG. 27 is a schematic cross sectional view to show a sixth example of the fall-out-prevention means.

FIG. 27 shows imbedding a filament-type of wire material 47 into the end in the axial direction of the clutch retainer 28a such that it is engaged with a protrusion 46 that is formed on the end in the radial direction of the roller 26.

Figure 28:
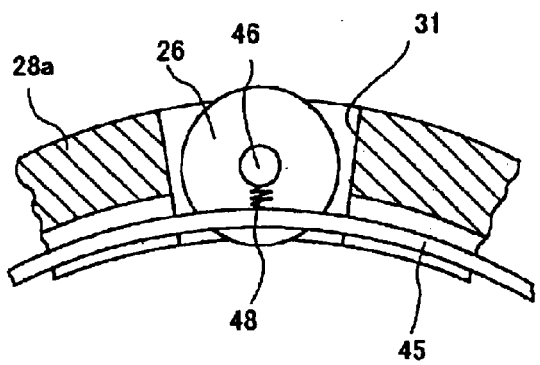
FIG. 28 is a schematic cross sectional view to show a seventh example of the fall-out-prevention means.

FIG. 28 shows a spring 48 that is placed between the wire ring 45 and the protrusion 46 in the example shown in FIG. 26, so as to apply an elastic force on the roller 26 in the radial direction of the clutch retainer 28a.

Figure 29:
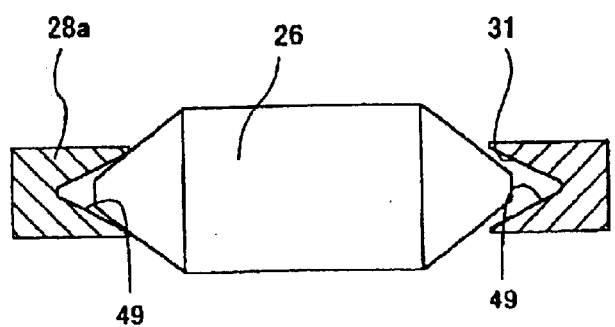
FIG. 29 is a schematic cross sectional view to show an eighth example of the fall-out-prevention means.

FIG. 29 shows concave sections 49 that are formed on the inner peripheral surface on both ends in the axial direction inside the pocket 31 that is formed in the clutch retainer 28a, such that both of the pointed end sections in the axial direction of the roller 26 are fitted into these concave sections 49.

Figure 30:
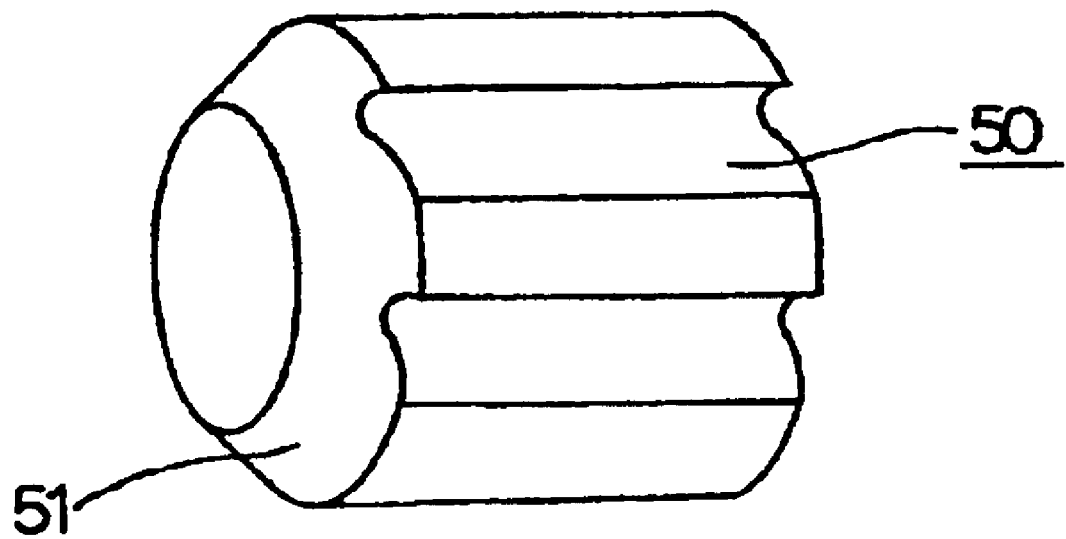
FIG. 30 is a schematic cross sectional view of a jig for use in working an embodiment of the present invention.

When performing the method of assembling the pulley apparatus with built-in roller clutch of this invention, before pushing the like of the inner clutch ring into the inner-diameter side of the rollers, the rollers can be simultaneously moved using a jig 50 as shown in FIG. 30 against the springs, and simultaneously moved to a specified position in the circumferential direction of the retainer. The jig 50 that is used in this case, has an uneven surface that is substantially the same as the cam surface that is formed around the outer peripheral surface of the like of the inner clutch ring, and has a fitted section that is engaged with the fitting section of the clutch retainer (for example the concave sections of the uneven surface that is similar to the cam surface), and it has a chamfered section 51 that is formed around the outer peripheral edge on the end in the axial direction. Also, this jig 50 is pushed into the inner-diameter side of the roller before the like of the inner clutch ring is done, and simultaneously moves the rollers in the circumferential direction against the elastic force of the springs, and moves the rollers to a specified position in the circumferential direction between the inner peripheral surface of the like of the outer clutch ring and the outer peripheral surface of the like of the inner clutch ring. With the jig 50 keeping the rollers at this specified position, the like of the inner clutch ring is pushed into the inner-diameter side of the rollers, and then the jig 50 is removed from the inner-diameter side of the rollers. It is also possible for the direction that the jig and the like of inner clutch ring are pushed into the inner-diameter side of these rollers to be in the opposite direction (pushed in from the opposite side in the axial direction) or in the same direction. In either case, the jig is pushed out from the inner-diameter side of the rollers as the like of inner clutch ring is pushed into the inner-diameter side of the rollers. When performing assembly using this kind of jig, it is not always necessary to form the chamfered sections on the ends in the axial direction of the rollers and on the outer peripheral edge on one end in the axial direction of the like of inner clutch ring (they are unnecessary but can still be formed).

Industrial Application

This invention is constructed and functions as described above, and provides an assembly method for assembling a pulley apparatus with built-in roller clutch easily while at the same time adequately maintaining durability and reliability.

What is claimed is:

1. A method of assembling a pulley apparatus with built-in roller clutch which, for use in belt transmission of an engine auxiliary equipment, comprises: a pulley, a shaft member located on the inner-diameter side of the pulley, a roller clutch provided between the pulley and the shaft member, a first ball bearing provided between the pulley and the shaft member at one side thereof in the axial direction and a second ball bearing provided between the pulley and the shaft member at the other side thereof in the axial direction, the roller clutch comprising: an outer-diameter section provided on the inner peripheral section of the pulley, an inner-diameter section provided on the outer peripheral section of the shaft member and having an outer peripheral surface provided with a cam section, a retainer provided between the outer-diameter section and the inner-diameter section and having a plurality of pockets, rollers held on the inside of the respective pockets, and a plurality of springs engaged with the retainer to push the rollers, respectively, wherein the roller clutch is adapted to be locked in one rotational direction and unlocked in the other rotational direction, the first ball bearing comprising an outer-diameter section, inner-diameter section and a plurality of first balls, the outer-diameter section being located in the inner peripheral section of the pulley and having an inner peripheral surface formed with a first outer-ring raceway, the inner-diameter section being located in the outer peripheral section of the rotating shaft and having an outer peripheral surface formed with a first inner-ring raceway, and the first balls being provided between the first inner-ring raceway and the first outer-ring raceway, the second ball bearing comprising an outer race, inner race and a plurality of second balls, the outer race being fitted to the inner peripheral surface of the pulley and having an inner peripheral surface formed with a second outer-ring raceway, the inner race being fitted onto the outer peripheral surface of the shaft member and having an outer peripheral surface formed with a second inner-ring raceway, and the second balls being provided between the second inner-ring raceway and the second outer-ring raceway, wherein the inner race and the shaft member form a shaft member unit, the inner-diameter section of the roller clutch having a first engagement section to be engaged with the retainer of the roller clutch, the retainer of the roller clutch having a second engagement section to be engaged with the first engagement section of the inner-diameter section of the roller clutch, and a fall-out-prevention means for the rollers, the shaft member unit having a plurality of step sections such that two of the step sections are formed to provide a means to regulate movement in the axial direction of the retainer of the roller clutch, the roller clutch having a chamfered section formed on at least one of the ends of the rollers and the outer peripheral edge of the inner-diameter section, the method comprising holding the rollers inside the pockets that are formed in the retainer of the roller clutch, pressing the rollers with the springs which are engaged with the retainer, and then installing the retainer on the inner-diameter side of the outer-diameter section of the roller clutch to form an assembly, then engaging the second engagement section of the retainer in the assembly with the first engagement section of the inner-diameter section of the roller clutch ring, so that relative rotation between the inner-diameter section and the retainer is prevented, inserting the inner-diameter section of the roller clutch under the rollers of the assembly by way of the chamfered section to simultaneously compress the springs, and then installing the second ball bearing between the inner peripheral surface of the pulley and the outer peripheral surface of the shaft member.

2. A method of assembling a pulley apparatus with built-in roller clutch of claim 1 wherein the sum of the chamfering amount at the end of the rollers and the chamfering amount of the outer peripheral portion of the cam section is larger than the amount of protrusion of the rollers into the inner-diameter side of the inner-diameter section from the outer peripheral surface of the inner-diameter section in the state where the retainer of the assembly is provided coaxial with the inner-diameter section, and where the second engagement section of the retainer is engaged with the first engagement section of the inner-diameter section.

3. A method of assembling a pulley apparatus with built-in roller clutch which, for use in a belt transmission of an engine auxiliary equipment, comprises a pulley, a shaft member provided on the inner diameter side of the pulley, a roller clutch provided between the pulley and the shaft member, a first ball bearing provided between the pulley and the shaft member at one side thereof in the axial direction, and a second ball bearing provided between the pulley and the shaft member at the other side thereof in the axial direction, the roller clutch comprising an outer-diameter section provided in the inner peripheral section of the pulley, an inner-diameter section provided in the outer peripheral section of the shaft member and having an outer peripheral surface formed with a cam section, a retainer provided between the outer-diameter section and the inner-diameter section and having a plurality of pockets, rollers held within the pockets and springs engaged with the retainer to press the rollers, and wherein the roller clutch is locked in one rotational direction and unlocked in the other rotational direction, the first ball bearing comprising an outer-diameter section provided in the inner peripheral section of the pulley and having an inner peripheral surface formed with a first outer-ring raceway, an inner-diameter section provided in the outer peripheral portion of the shaft member and having an outer peripheral surface formed with a first inner-ring raceway, and a plurality of first balls provided between the first inner-ring raceway and the first outer-ring raceway, the second ball bearing comprising an outer race fitted into the inner peripheral section of the pulley and having an inner peripheral surface formed with a second outer-ring raceway, an inner race fitted onto the outer peripheral section of the shaft member and having an outer peripheral surface formed with a second inner-ring raceway, and a plurality of balls provided between the second inner-ring raceway and the second outer-ring raceway, wherein the shaft member and the inner race form a shaft member unit, the inner-diameter section of the roller clutch having a first engagement section to be engaged with the retainer of the roller clutch, the retainer of the roller clutch having a second engagement section to be engaged with the first engagement section of the inner-diameter section of the roller clutch, and a fall-off-prevention means for the rollers, and the shaft member unit having a plurality of step sections such that the displacement in the axial direction of the retainer of the roller clutch is regulated with two of the step sections, the method comprising holding the rollers in the pockets of the retainer of the roller clutch, pressing the rollers by the springs engaged with the retainer, and in this state, installing the retainer on the inner-diameter side of the outer-diameter section of the roller clutch to form an assembly, providing a jig which has substantially the same outside shape to the shape of the inner-diameter section of the roller clutch and has a chamfered section on the side of insertion into the assembly to simultaneously compress the springs, using the chamfered portion to temporarily insert the jig under the rollers in the assembly to simultaneously compress the springs, engaging the second engagement section of the retainer of the assembly with the first engagement section of the inner-diameter section of the roller clutch, then inserting the inner-diameter section of the roller clutch on the inner diameter side of the assembly, and installing the second ball bearing between the inner peripheral surface of the pulley and the outer peripheral surface of the shaft member.

4. The method of assembling the pulley apparatus with built-in roller clutch of any one of claims 1 to 3 wherein the installation of the second ball bearing between the pulley and the shaft member is made through any means selected from the group of pressing-in, crimping, welding and bonding.

5. A pulley apparatus with built-in roller clutch for use in belt transmission of an engine auxiliary equipment comprising a pulley, a shaft member provided on the inner diameter side of the pulley, a roller clutch provided between the pulley and the shaft member, a first ball bearing provided between the pulley and the shaft member at one side thereof in the axial direction, and a second ball bearing provided between the pulley and the shaft member at the other side thereof in the axial direction, the roller clutch comprising an outer-diameter section provided in the inner peripheral section of the pulley, an inner-diameter section provided in the outer peripheral section of the shaft member and having an outer peripheral surface formed with a cam section, a retainer provided between the outer-diameter section and the inner-diameter section and having a plurality of pockets, rollers held within the pockets, and springs engaged with the retainer to press the rollers, and wherein the roller clutch is locked in one rotational direction and unlocked in the other rotational direction, the first ball bearing comprising an outer-diameter section provided in the inner peripheral section of the pulley and having an inner peripheral surface formed with a first outer-ring raceway, an inner-diameter section provided in the outer peripheral section of the shaft member and having an outer peripheral surface formed with a first inner-ring raceway, and a plurality of balls provided between the first inner-ring raceway and the first outer-ring raceway, the second ball bearing comprising an outer race being fitted into the inner peripheral surface of the pulley and having an inner peripheral surface formed with a second outer-ring raceway, an inner race fitted onto the outer peripheral surface of the shaft member and having an outer peripheral surface formed with a second inner-ring raceway, and a plurality of balls provided between the second inner-ring raceway and the second outer-ring raceway, wherein the shaft member and the inner race form a shaft member unit, the retainer of the roller clutch having a fall-off-prevention means for the rollers, the shaft member unit having a plurality of step sections such that the displacement in the axial direction of the retainer of the roller clutch is regulated with two of the step sections, and wherein the roller clutch has a chamfered section formed on at least one of the end of the rollers of the roller clutch and the outer peripheral edge of the inner-diameter section to simultaneously compress the springs.

6. The pulley apparatus with built-in roller clutch of claim 5 wherein the sum of the chamfering amount at the end of the rollers and the chamfering amount at the outer peripheral portion of the cam section is larger than the amount of protrusion of the roller into the inner-diameter side of the inner-diameter section from the outer peripheral surface of the cam section of the inner-diameter section in the state where the retainer of the assembly is provided coaxial with the inner-diameter section, and where the second engagement section of the retainer is engaged with the first engagement section of the inner-diameter section.

7. The pulley apparatus with built-in roller clutch of any one of claims 5 to 6 wherein the installation of the second ball bearing between the pulley and the shaft member is made through any means selected from the group of pressing-in, crimping, welding and bonding.

* * * * *